US012762546B2

(12) United States Patent
Posner

(10) Patent No.: US 12,762,546 B2
(45) Date of Patent: Oct. 13, 2026

(54) LIQUIDITY AND SECURITY MECHANISMS AS PART OF A UNIFIED CRYPTOGRAPHIC WALLET

(71) Applicant: Block, Inc., San Francisco, CA (US)

(72) Inventor: Jesse Posner, Fairfax, CA (US)

(73) Assignee: Block, Inc., Oakland, CA (US)

( * ) Notice: Subject to any disclaimer, the term of this patent is extended or adjusted under 35 U.S.C. 154(b) by 95 days.

(21) Appl. No.: 18/304,822

(22) Filed: Apr. 21, 2023

(65) Prior Publication Data

US 2024/0362623 A1 Oct. 31, 2024

(51) Int. Cl.
*G06Q 20/38* (2012.01)
*G06Q 20/36* (2012.01)

(52) U.S. Cl.
CPC ....... *G06Q 20/381* (2013.01); *G06Q 20/3674* (2013.01); *G06Q 2220/00* (2013.01)

(58) Field of Classification Search
None
See application file for complete search history.

(56) References Cited

U.S. PATENT DOCUMENTS 11,393,024 B1 * 7/2022 Kodihalli ............... G06N 20/00
2019/0139037 A1 * 5/2019 Khalil ................... H04L 9/3247
2019/0251524 A1 * 8/2019 Sadrizadeh ............... H04L 9/30
2019/0303888 A1 * 10/2019 Hamasni ............ G06Q 20/0658
2020/0193420 A1 * 6/2020 Vogel ................ G06Q 20/3829
2021/0357917 A1 * 11/2021 Dalton ............... G06Q 20/3676
2022/0374880 A1 * 11/2022 Mallela .................. G06Q 20/02
2023/0043702 A1 * 2/2023 Sells ...................... G06Q 40/03
2023/0055525 A1 2/2023 Sells et al.
2023/0117430 A1 4/2023 Quigley et al.
2023/0289791 A1 * 9/2023 Zarick .................. G06Q 20/381
2023/0298005 A1 * 9/2023 Saad .................... G06Q 20/381
2023/0298034 A1 * 9/2023 Nonni .................... G06Q 20/10 705/75
2024/0257084 A1 * 8/2024 Kim ..................... G06Q 20/065
2024/0281795 A1 * 8/2024 Lindell .............. G06Q 20/3674
2024/0289776 A1 * 8/2024 Bimolaksono ....... G06Q 20/381
(Continued)

FOREIGN PATENT DOCUMENTS

CN 112348677 A * 2/2021 ............. G06F 21/64

OTHER PUBLICATIONS

Reddit, "Does anyone know how Muun wallet works? [ . . . ]", https://www.reddit.com/r/lightningnetwork/comments/Ipc65v/does_anyone_know_how_muun_wallet_works_the_answer/ , Feb. 22, 2021 (Year: 2021).*

(Continued)

*Primary Examiner* — Matthew S Gart
*Assistant Examiner* — Mark A Malkowski
(74) *Attorney, Agent, or Firm* — Polsinelli PC

(57) ABSTRACT

Liquidity and security mechanism are described as part of a unified cryptographic wallet. In an implementation, a request is received by a server to initiate a transaction involving a fund transfer using a blockchain network or a decentralized network. A determination is made, automatically and without user intervention, whether to perform the transaction, e.g., based on a threshold. The request responsive to determining to perform the transaction. The signed request is communicated to initiate the fund transfer of the transaction using the blockchain network or the decentralized network.

18 Claims, 18 Drawing Sheets

(56) References Cited

U.S. PATENT DOCUMENTS

2024/0346481 A1* 10/2024 Liu ........................... H04L 9/50

OTHER PUBLICATIONS

BTC Sessions, "MUUN Bitcoin Wallet—On Chain and Lightning Combined!" https://www.youtube.com/watch?v=5SbpyInulJk , Jun. 15, 2021 (Year: 2021).*
Voltage, "Splicing Lightning Network with Dusty—Voltage Twitter Spaces" https://www.youtube.com/watch?v=e1Bkr8rPKuU , Nov. 10, 2022 (Year: 2022).*
Reddit, "Does anyone know how Muun wallet works? [ . . . ]", https://www.reddit.com/r/lightningnetwork/comments/lpc65v/does_anyone_know_how_muun_wallet_works_the_answer/ , Feb. 22, 2021 (Year: 2021).*
Al-Shehabi, "Bitcoin Transaction Fee Estimation using Mempool State and Linear Perceptron Machine Learning Algorithm", https://web.archive.org/web/20190428092157/https://scholarworks.sjsu.edu/cgi/viewcontent.cgi?article=1637&context=etd_projects 2018, archived Apr. 28, 2019. (Year: 2018).*
Bitcoin Optech (Optech), "Zero-conf channels", https://web.archive.org/web/20220701112841/https://bitcoinops.org/en/topics/zero-conf-channels/, archived Jul. 1, 2022 (Year: 2022).*
Papadis et al., "Deep Reinforcement Learning-based Rebalancing Policies for Profit Maximization of Relay Nodes in Payment Channel Networks (V1)" https://arxiv.org/pdf/2210.07302v1 , Oct. 13, 2022 (Year: 2022).*
Ravenna (Ravenna-2), "Splices and Liquidity in the Lightning Network", https://web.archive.org/web/20191012232029/https://blog.muun.com/splices-and-liquidity-in-the-lightning-network/ , Jul. 8, 2019 , archived Oct. 12, 2019 (Year: 2019).*
Ravenna, "Turbo channels", https://blog.muun.com/turbo-channels/, 2020 (Year: 2020).*
Curious Inventor, "Why & How to Run a Bitcoin/Lightning Node w/ MyNode", Youtube, https://www.youtube.com/watch?v=3xw-IMBbMds ; Feb. 13, 2021 (Year: 2021).*
"Autoloop", https://web.archive.org/web/20230203035049/https://docs.lightning.engineering/lightning-network-tools/loop/autoloop (Year: 2023).*
Litex, Dynamic Channel Deposit and Withdrawl for Lightning Network, https://diyhpl.us/~bryan/papers2/bitcoin/ (Year: 2018).*
Lightning Bolts, "why the Lightning Network channel can't Increase Balance?", https://github.com/lightning/bolts/issues/280#issuecomment-389210911 (Year: 2021).*
O'Hare et al., "Money & Trust in Digital Society—Bitcoin, Nostr, Stablecoins, Digital Objects and Machine Learning in B2B Telepresent Mixed Reality", Cornell University, DOI: https://doi.org/10.48550/arXiv.2207.09460, Jun. 2023, 493 pages.

* cited by examiner

LIQUIDITY AND SECURITY MECHANISMS AS PART OF A UNIFIED CRYPTOGRAPHIC WALLET

TECHNICAL FIELD

Blockchain networks provide a variety of functionality in connection with implementing and securely transferring various digital assets, examples of which include cryptographic tokens, such as tokens for "smart contracts" and non-fungible tokens (or "NFTs"). An additional decentralized network has been developed to sit on top of the blockchain networks and enable transactions involving such digital assets to be executed without committing each transaction to the underlying blockchain network. The decentralized network is referred to as "layer 2" network because the decentralized network framework and protocol is built on top of a blockchain network, which is referred to as a "layer 1" network.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
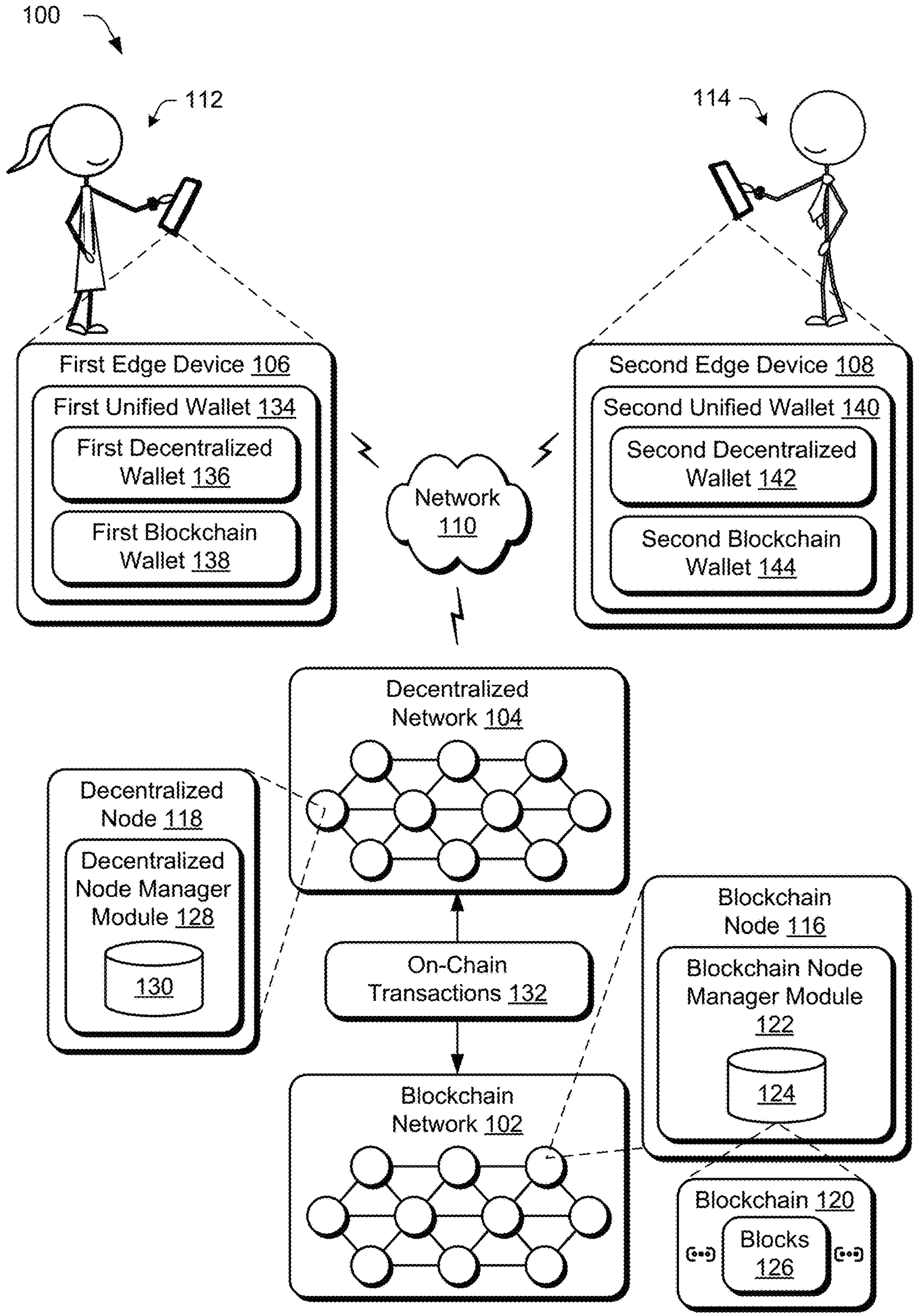
FIG. 1 is a block diagram of a non-limiting example environment in which liquidity and security mechanisms as part of a unified cryptographic wallet may be implemented as described herein according to an implementation of the present subject matter.

Blockchain networks provide a variety of functionality in connection with implementing and securely transferring various digital assets, examples of which include cryptographic tokens in support of cryptocurrencies, tokens for "smart contracts," and non-fungible tokens. While the architecture and protocols of the blockchain network provide a variety of advantages that support the secure transfer of digital assets (and provenance of physical assets in various cases), many blockchain networks have scaling limitations. For example, a fixed number of transactions can occur on the Bitcoin and Ethereum networks each day due to computer processing requirements and associated time delays.

Due to this, additional decentralized networks have been developed to sit on top of blockchain networks and enable transactions involving blockchain-implemented digital assets to be executed, without recording every transaction to a blockchain network. These additional decentralized networks are referred to as "layer 2" networks (or "off-chain" solutions) because a framework and protocol of the layer 2 network is built on top of a blockchain network, which is referred to as a "layer 1" network. In addition to the Bitcoin and Ethereum networks, examples of layer 1 blockchain networks include the Litecoin blockchain network, the Ripple blockchain network, and the Hyperledger blockchain network. Examples of layer 2 decentralized networks include the Lightning Network, Ethereum Plasma, Raiden, and RIF Lumino. The techniques described herein are not limited to such example layer 1 and layer 2 networks.

Accordingly, decentralized networks as implemented as a layer 2 network address a challenge of scaling of layer 1 networks, e.g., limited block size, limited number of transactions per second, and so forth. To achieve increased throughput, the decentralized network is employed such that a single transaction on a layer 1 network is usable to settle a series of "off chain" transactions from the layer 2 network (i.e., the decentralized network), and may do so without creating a trust relationship for each transaction.

In one approach, separate wallets are used for layer 1 and layer 2 networks. Fund transfers are therefore performed manually between the wallets and as such involve corresponding fees, processing time, and power consumption. To transfer funds from a layer 1 wallet to a layer 2 wallet (i.e., from a wallet associated with blockchain network to a wallet associated with a decentralized network), fees and delays in processing time are incurred as part of "on chain" transactions for these transfers, e.g., to wait 20 minutes for specifying a transfer and an hour for blocks to be produced.

An example developed to address these challenges introduces a number of design limitations. A first design limitation is that an entirety of the funds is maintained "outside" of the layer 2 network. Therefore, in order to send funds over the layer 2 network, a swap is involved from a cryptographic token from the layer 1 network to a cryptographic token in the layer 2 network for an outgoing transfer, and as such incurs processing time and power consumption inefficiencies caused as part of the chain transaction and corresponding delays. Consequently, this swap is inefficient and does not support typical real world usage scenarios. To speed up access, this technique accepts a double spending risk from customers for small transactions (e.g., accept before confirm) and therefore introduces risk before a swap transaction is confirmed. Consequently, benefits made available through the use of layer 2 networks are limited to small transactions and lost otherwise in this conventional technique.

Accordingly, techniques and systems are described herein to address these technical challenges and limitations by implementing a unified wallet. The unified wallet is configured to manage fund availability and access to blockchain networks (i.e., layer 1 networks) and decentralized networks (i.e., layer 2 networks). Additionally, the unified wallet is configurable to manage fund availability automatically and without user intervention in a manner that is invisible to the user, such that, the user is unaware as to "decentralized network versus blockchain network" usage with implementation unified in the background. A user interface is supported by the unified wallet to provide a unified abstraction of funds that are available separately via the blockchain network and the decentralized network as a unified balance.

Portions of the following discussion describe dimensions of the unified cryptographic wallet, examples of which include security and liquidity. Regarding the security dimension, layer 2 networks in real-world implementations are viewed as a less secure "hot wallet" because of key management. Layer 1 networks, for instance, support storage of offline keys with multi-signature functionality. In layer 2 networks, on the other hand, a set of keys are maintained as "hot" that are accessible and cannot be made "cold," e.g., for offline storage. Conventional wallet techniques address this security issue by maintaining cryptographic tokens outside the layer 2 network as described above, which introduces the above-described limitations and technical challenges.

The unified wallet techniques described herein, however, support an ability to maintain cryptographic tokens within a decentralized wallet associated with the decentralized network (i.e., the layer 2 network) thereby making these tokens available in support of faster transaction execution, reduced fees, and reduced power consumption. When the funds are migrated back onto the blockchain, operations are already incurred to move the cryptograph tokens out of decentralized wallet, and therefore these operations comply with user expectations already involved in a corresponding delay/lag and degradation.

Security is maintained through use of the unified wallet such that layer 1 and layer 2 operations are both secure. In one example, scripts of the decentralized network are changed so that the scripts do not conform to standard protocols. A wallet application executing on an edge device of an entity (e.g., user), for instance, communicates with a wallet server as part of a multi-party computation (MPC) (e.g., "two-of-three") security mechanism. A mobile application key is stored by the wallet application at the edge device, a wallet server key is stored at the wallet server, and a hardware key is stored at a wallet hardware key device. The wallet hardware key device, for instance, supports biometric techniques through use of a sensor to verify identity of the entity before providing access to the hardware key. In the "two-of-three" security mechanism, two of the three keys are used to sign a transaction in order to enable a fund transfer, e.g., to "spend Bitcoin." In this way, transactions are secured and support an ability to maintain cryptographic tokens "on" the decentralized network and as such supports increased transaction efficiency.

The wallet server is also configurable to support additional security measures. Consider a scenario in which a user executes a wallet application on a mobile phone and the mobile phone becomes compromised by a malicious entity. A threshold is usable by the wallet server to restrict transaction over a specified amount, e.g., the wallet server does not sign the transaction using the wallet server key for transactions initiated by the wallet application over the threshold amount. Such transactions may be sent from the wallet application to the wallet hardware key device or signature because of increased security made available by the hardware device, e.g., use of a fingerprint scanner or other biometric sensor to verify the user's identity, a personal identification number (PIN), and so forth.

In order to initiate a transaction, the wallet application receives an input to initiate the transaction via a user interface output at a corresponding edge device. The wallet application signs the transaction using a mobile application key, and communicates the transaction to a wallet server, which is then signed using a wallet server key. The signed transaction is then communicated to a transaction server to perform the transaction, e.g., to "pay out" to a destination specified using another cryptography key. In order to further protect against compromise of the wallet application by a malicious party, the wallet application is limited in an implementation to communication with the wallet server and is not permitted to communicate directly with the transaction server. In another example, the transaction server exposes an application programming interface (API), access to which is limited to the wallet server.

Continuing with the previous example, the wallet application communicates with the wallet server to initiate the transaction. The wallet server then determines whether to permit the transfer and is also configurable to determine which network is to be used to perform the transaction, e.g., the decentralized network or the blockchain network. The wallet server, in an example, receives a request to initiate a transaction (e.g., from a wallet application or other source) and selects the network. The wallet server, for instance, selects the network based on an amount of time estimated to perform the transaction, respectively, by the decentralized network or the blockchain network, an amount of fees to perform the transaction, respectively, by the decentralized network or the blockchain network, and so forth.

The wallet application is also configurable to determine which network is to be used to implement a transaction, e.g., to transfer funds via a layer 1 or layer 2 network. Selection of the network is usable to address a variety of considerations. Fees on a layer 2 network, for instance, may be set as a percentage of value, therefore the bigger the transfer, the higher the fee. As a result, there is a point at which a transfer of funds on a layer 1 network is cheaper to perform than on a layer 2 network. There are also tradeoffs between time and cost, e.g., cheaper and slower versus faster and expensive. Accordingly, in this example it is generally cheaper and faster to transfer funds on a level 2 network for lower amounts. An ability to select the network is made possible in the techniques described herein due to liquidity that is made available on both networks through use of the unified wallet, which is not possible in conventional techniques. In an implementation, a machine-learning model is trained and retrained over time to make this selection, e.g., based on subsequent use of funds by a respective entity (and therefore determine an amount of urgency for the transaction), network responsiveness, and so forth.

Completion of the transaction causes the transaction server to "pay out" to particular cryptographic keys implemented by a respective blockchain network or decentralized network. In one example, a layer 2 network pays out to a single cryptographic key, e.g., using a two-of-three setup. Therefore, if a malicious party obtains access to a wallet application and attempts to initiate a transaction or close a channel, the channel pays out to the two-of-three keyset which protects against attack patterns and bringing funds online. In another example, a single public/private key pair is split into pieces, which supports an ability to sign for a keypair without bringing the pieces together.

The unified wallet techniques are configurable to implement a variety of liquidity mechanisms. In a first example, the unified wallet employs opportunistic on-chain liquidity management by leveraging an on-chain event involving the layer 1 network. Each time an "on chain" transaction is performed, delay and corresponding fees are incurred. Therefore, in this example a unified wallet transaction performs a fund transfer that leverages other on-chain events. The transaction, in one example, is grouped in conjunction with other fund transfers that are also being performed by "splicing" onto these other transactions.

In a second example, a "time lock" is employed as part of the transaction. The time lock, for instance, is utilized as part of the "two-of-three" security technique, such that after expiration of the time lock the funds are free to spend. The time lock is usable to protect against double spending.

In a third example, deferred fee consolidation splicing is performed in which funds are proactively moved to maintain liquidity. The fee is subsidized and then paid upon performance of a transaction. In an implementation, machine learning techniques are utilized through a machine-learning model to set parameters for the subsidy and transaction, e.g., based on fee outlay, liability, temporal considerations, and so forth. Other examples are also contemplated, e.g., in which the wallet application checks for funds upon initial execution and automatically moves funds to provide sufficient liquidity for both networks. Further discussion of these and other examples are included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is a block diagram of a non-limiting example environment 100 in which liquidity and security mechanisms as part of a unified cryptographic wallet may be implemented as described herein according to an implementation of the present subject matter. The environment 100 includes blockchain network 102, a decentralized network 104, and a plurality of edge devices represented in the environment 100 by a first edge device 106 and second edge device 108 that are communicatively coupled, one to another, via a network 110. In an example, the blockchain network 102 (which is also decentralized) is a layer 1 network and the decentralized network 104 is a layer 2 network. The first edge device 106 is associated with a first entity 112 and the second edge device 108 is associated with a second entity 114. The blockchain network 102 is implemented using a plurality of nodes, an example of which is blockchain node 116. The decentralized network 104 is also implemented using a plurality of nodes, an example of which is illustrated as a decentralized node 118.

Computing devices that implement the environment 100 are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described below.

In accordance with the described techniques, the blockchain network 102 includes a plurality of blockchain nodes (including the blockchain node 116) interconnected as a network, e.g., a distributed network. Each blockchain node of the blockchain network 102 is implemented using processing, memory, and networking resources of underlying computing devices that operate as the infrastructure of a blockchain 120. In variations, the underlying computing resources leveraged to implement an individual blockchain node 116 may be local to a particular computing device. However, in other variations, the underlying computing resources leveraged to implement an individual blockchain node 116 may be distributed and/or virtualized.

In the illustrated example, the blockchain node 116 is depicted as including a blockchain node manager module 122 and storage 124, the storage 124 being an example of an underlying computing resource leveraged by the blockchain node manager module 122 to implement the blockchain node 116. Other underlying resources of one or more computing devices are also made available for operating the blockchain node 116. Broadly, the blockchain node manager module 122 is configured to leverage those resources to implement the blockchain node 116 on behalf of the one or more computing devices.

By way of example, the blockchain node manager module 122 manages the storage 124 of the one or more computing devices implementing the blockchain node 116, such as by causing a copy of the blockchain 120 to be maintained in the storage 124. The copy of the blockchain 120 stored at the storage 124 may be a partial or full copy of the blockchain 120, depending on one or more characteristics of the blockchain node 116 (e.g., a type) and/or a time (e.g., whether updates have been made to the blockchain 120 via other nodes in the blockchain network 102). The blockchain node manager module 122 may manage other resources of the computing devices in connection with operation of the blockchain node 116, such as memory and processors of those devices to perform computations (e.g., transaction validation), operating systems of those devices, and network connections of those devices (e.g., to commit changes to the blockchain 120 and to receive updates to the blockchain node's 116 copy of the blockchain 120), to name just a few. In short, blockchain nodes store, communicate, process, and manage data that makes up the blockchain 120. As illustrated in FIG. 1, the blockchain nodes 116 are interconnected to exchange data via one or more computer networks, such as the Internet. In this way, the blockchain nodes 116 operate as a peer-to-peer network in a distributed and decentralized manner.

Broadly, the blockchain 120 is formed using a plurality of blocks 126 having transaction data describing batches of validated transactions that are hashed and encoded. A subsequently generated block in the blockchain 120 includes a hash, which is a cryptographic hash of the block 126 in the blockchain 120, thereby linking blocks to each other to form the blockchain 120. As a result, the blocks 126 cannot be altered retroactively without altering each subsequent block in the blockchain 120 and in this way protecting against attacks by malicious parties. Further discussion of implementation of the blockchain is described in relation to FIG. 3.

While architecture and protocols of the blockchain 120 provide a variety of advantages that support the secure transfer of digital assets (and provenance of physical assets in various cases), many blockchain networks have scaling limitations. For example, a fixed number of transactions may occur on the Bitcoin network and the Ethereum network each day. This limits Bitcoin's and Ethereum's feasibility as a medium of exchange for goods and services and can also lead to high fees (e.g., "gas" fees) for executing transactions at various times of day and throughout the week.

In accordance with the described techniques, the decentralized network 104 is a "layer 2" network that sits on top of the blockchain network 102, which is a "layer 1" network. The decentralized network 104 is also implemented using a plurality of nodes, an example of which is illustrated as a decentralized node 118 having a corresponding decentralized node manager module 128 and storage 130.

One example of the decentralized network 104 is the Lightning Network, which is a "layer 2" network that sits on top of the Bitcoin blockchain network, which is a "layer 1" network. Other examples of blockchain networks that are layer 1 networks include, but are not limited to, the Ethereum blockchain network, the Litecoin blockchain network, the Ripple blockchain network, and the Hyperledger blockchain network. Other examples of decentralized networks that are layer 2 networks (because their framework or protocol is built on top of a blockchain network) include, but are not limited to, Ethereum Plasma, Raiden, and RIF Lumino.

In variations, the underlying architecture and protocols for implementing the decentralized network 104 are based on the notion of a "channel," which is a medium of communication that can be established between two decentralized nodes of the decentralized network 104. For example, a channel is established between two decentralized nodes across one or more networks (e.g., the Internet) and using the underlying network interfaces and other networking hardware with which the two decentralized nodes are implemented. Once a channel is established between decentralized nodes of the decentralized network 104, a number of transactions can occur back and forth over the channel between the decentralized nodes and, notably, those transactions are executed in compliance with a protocol of the decentralized network 104 which is independent of recording of the transaction to the blockchain network 102 at the time the transactions are executed.

The use of channels to execute transactions "off-chain" enables transactions to be completed over the decentralized network 104 without involving computationally intensive tasks, such as validation, associated with the blockchain network 102. As such, usage of computational resources is reduced for nodes participating in the validation process. Conducting transactions "off-chain" also reduces the delay in completing a transaction, as discussed above, which can result from network congestion and queued transactions. Accordingly, using "channels" of the decentralized network 104 improves the responsiveness (i.e., efficiency and speed) of processing a transaction. Conducting transactions "off-chain" using the decentralized network 104 also enables improvements to privacy, especially in the case of layering the decentralized network 104 on a public blockchain network, as the transaction is not publicly broadcasted.

The illustrated example includes on-chain transactions 132, which represent the transactions to open and close channels of the decentralized network 104, such that those opening and closing transactions are validated using validation mechanisms of the blockchain 120 and permanently recorded in transaction data of the blockchain 120. In one or more implementations, one or more connections (e.g., channels, bridges, etc.) are opened between the blockchain network 102 and the decentralized network 104 at intervals (e.g., regular or irregular) to communicate the on-chain transactions 132 between those networks.

As previously described, separate wallets are used in some examples for access to respective layer 1 and layer 2 networks. Fund transfers are therefore performed manually between the wallets and as such involve corresponding fees, processing time, and power consumption. To transfer funds from a layer 1 wallet to a layer 2 wallet (i.e., from a wallet associated with blockchain network to a wallet associated with a decentralized network), fees and delays are incurred as part of "on chain" transactions 132 for these transfers, e.g., to wait twenty minutes for specifying a transfer and an hour for blocks to be produced.

In the techniques described herein, however, unified cryptographic wallets are utilized to support access to both the blockchain network 102 and the decentralized network 104. Examples of the unified cryptographic wallets are illustrated as a first unified wallet 134 implementing a first decentralized wallet 136 and a first blockchain wallet 138 as associated with the first entity 112 and a second unified wallet 140 implementing a second decentralized wallet 142 and a second blockchain wallet 144.

The first and second unified wallets 134, 140 are configured to manage fund availability and access to the blockchain network 102 and the decentralized network 104. As part of this, a user interface is supported to provide a unified abstraction of funds that are available separately via the blockchain network and the decentralized network as a unified balance as further described in relation to FIG. 5. In the following discussion, two dimensions are utilized to implement the unified cryptographic wallet, security and liquidity. Further discussion security mechanisms and the use of cryptographic keys is described in relation to FIGS. 4, 6, 9, and 10. Further discussion of liquidity mechanisms is described in relation to FIGS. 5, 7, 8, and 11.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Figure 2:
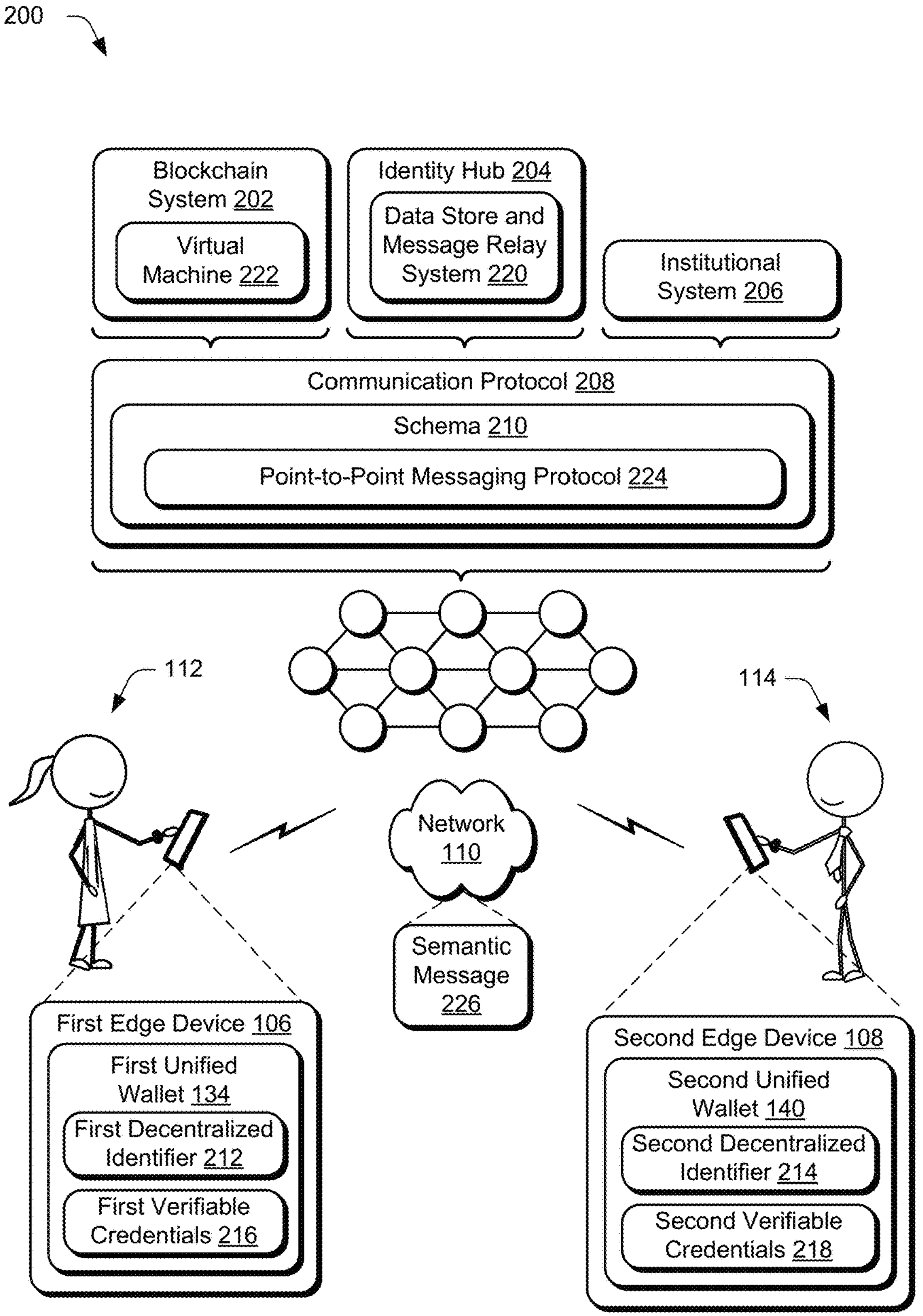
FIG. 2 is a non-limiting illustration of an example system that is operable to implement blockchain supported resource transfer communication protocol techniques described herein according to an implementation of the present subject matter.

FIG. 2 is a non-limiting illustration of an example system 200 that is operable to implement blockchain supported resource transfer communication protocol techniques described herein according to an implementation of the present subject matter. The illustrated system 200 includes the first edge device 106 and first unified wallet 134, the second edge device 108 and second unified wallet 140, a blockchain system 202 as corresponding to the blockchain network 102 of FIG. 1, an identity hub 204, and an institutional system 206 (e.g., in support of performing a fund transfer of a transaction by a transaction server) that are communicatively coupled, one to another, via the network 110.

In accordance with the described techniques, the system 200 implements a communication protocol 208 configured to provide blockchain support for resource transfer in this example, i.e., to transfer funds as part of a transaction. The communication protocol 208 incorporates various components, including decentralized identifiers and credentials as well as a schema 210. Examples of the decentralized identifiers include first and second decentralized identifiers 212, 214 as implemented by the first and second unified wallets 134, 140, respectively. Additionally, examples of the credentials include first and second verifiable credentials 216, 218 as implemented by the first and second unified wallets 134, 140, respectively.

The communication protocol 208 facilitates the formation of mutual trust between parties involved in a message transfer that is not centrally controlled. Mutual trust is implemented, for instance, through direct trust negotiation between the parties, use of mutually trusted third-party systems to "vouch" for the parties, and so forth. The communication protocol 208 is configurable in an example to implement trust in a manner that differs from conventional decentralized exchange protocols in that the model is not trustless. The communication protocol 208, for instance, is configurable to employ decentralized trust through a public key infrastructure (PKI) that is usable to secure communication between entities, e.g., the first and second edge devices 106, 108, the institutional system 206, and so forth. The communication protocol 208 is built upon the decentralized identifiers used by the first and second edges devices 106, 108 as well as other entities in the system 200, e.g., the institutional system 206. Decentralized identifiers in this example support verifiable, decentralized digital identity.

As such, decentralized identifiers are configurable to refer to a variety of different entity types (e.g., a user, organization, institution, data model, thing, abstract entity, and so forth) as determined by a controlling entity of the decentralized identifier. This is in contrast to typical federated identifiers, in that decentralized identifiers are decoupled from centralized registries, identity providers, and certificate authorities. For example, while other parties may be used to enable information discovery related to a decentralized identifier, this configuration supports an entity which is associated with a decentralized identifier control over the identity associated with the decentralized identifier without involving permission from another entity.

Decentralized identifiers (DIDs) are configurable as uniform resource identifiers (URIs) that associate a DID subject with a DID document, thereby supporting trustworthy interactions associated with that subject. Examples of the decentralized identifiers include a first decentralized identifier 212 associated with the first unified wallet 134 and a second decentralized identifier 214 associated with the second unified wallet 140. Decentralized identifier (DID) documents, which are linked to the decentralized identifiers, are configurable as a metadata file that includes a variety of data elements, examples of which include cryptographic material and routing endpoints. Cryptographic material is usable by an entity that is associated with the decentralized identifier to provide control, e.g., through use of public keys, digital signatures, and so forth. Routing endpoints specify locations, at which, data with an entity that is associated with the decentralized identifier is exchanged and/or at which the entity is contacted. The routing endpoints, for instance, specify an identity hub 204 having associated personal data storage and relay nodes used by a data store and message relay system 220.

Decentralized identifier techniques are implemented by the communication protocol 208 in a variety of ways. Examples include use of a communication protocol 208 that is open, public, and permissionless, and is tamper resistant. Further, the communication protocol 208 produces a record that is probabilistically finalized and independently, deterministically verifiable, even in the presence of segmentation, state withholding, and collusive node conditions. Further, the communication protocol 208 is not reliant on authorities, trusted third parties, or entities that cannot be displaced through competitive market processes.

Credentials are also used as part of the communication protocol 208, examples of which include the first and second verifiable credentials 216, 218 stored, respectively, as part of the first and second unified wallets 134, 140. These credentials are configured as cryptographically secure, respect privacy, and are machine verifiable. In one implementation, inclusion of a zero-knowledge proof is usable to further advance privacy and safety by preventing an ability to link across disclosures, reduces an amount of data that is discoverable, and reduces raw data value exposure.

The system 200 is also configurable to include a variety of additional entities that are involved as part of the communication protocol 208, examples of which are illustrated as a blockchain system 202 implementing a virtual machine 222 and an identity hub 204 implementing the data store and message relay system 220.

The identity hub 204 provides an interface, through which, to store, discover, and fetch data related to communications involved in a request (e.g., transaction involving a funds transfer) supported by the communication protocol 208. The data store and message relay system 220 of the identity hub 204, for instance, is usable to locate public or permissioned private data related to a particular decentralized identifier, e.g., the first and second decentralized identifiers 212, 214. The identity hub 204 is configurable as having a mesh-like datastore construction that supports an ability of an entity to operate multiple instances that synchronize to a same state across one another. Use of the mesh-like datastore construction provides an entity that is associated with the decentralized identity with an ability to secure, manage, and transact data with other entities without reliance on location or provider-specific infrastructure, interfaces, or routing mechanisms.

The identity hub 204 supports use of a semantic message 226 and respective data interfaces (e.g., as inferential application programming interfaces (APIs)) in accordance with the schema 210 that are accessible without direct knowledge of a semantic type of data that is to be exchanged. A diverse set of interactions and flows are modeled within these interfaces as part of the schema 210 by externally codifying sets of message schemas and processing directives to form respective protocols.

The semantic message 226 employs the schema 210 as supporting a naming convention of the datatypes of objects included in the message. Configuration of the semantic message 226 enables entities that receive the semantic message 226 to readily parse the message using the schema 210, e.g., to determine whether the semantic message 226 is of interest to the entity and process it accordingly. As such, the schema 210 of the semantic message 226 helps support the distributed architecture of the communication protocol 208. For example, the identity hub 204 is configured to identify, through semantics of the message, and process/forward the semantic message 226 to a respective institutional system 206 which can then also process the semantic message 226 based on the schema. In one example, the semantic messages 226 are signed by each entity through the process by the schema 210 as part of a point-to-point messaging protocol 224 as further described below.

Unified wallets (e.g., the first and second unified wallets 134, 140) act as agents for individuals or institutions by facilitating exchanges with the institutional system 206 or other third-party service provider system. As such, unified wallets are configurable to support a variety of functionalities. The first and second unified wallets 134, 140, for instance, support secure encrypted storage for verifiable credentials as illustrated, e.g., the first and second verifiable credentials 216, 218 for the blockchain network 102 and the decentralized network 104. The first and second unified wallets 134, 140 also support discovery of an institutional system 206 or other third-party service provider system by crawling the identity hub 204. The first and second unified wallets 134, 140 further include mechanisms for receiving, offering, and presenting verifiable credentials used as part of the communication protocol 208. Yet further, the first and second unified wallets 134, 140 implement digital signature mechanisms and support an ability to store a transaction history. The first and second unified wallets 134, 140 are configurable to support seamless transfer of credentials between wallets, and as such does not claim "ownership" of verifiable credentials. Additionally, operation of the first and second unified wallets 134, 140 is consent driven by an entity associated with the digital wallet.

The communication protocol 208 includes a plurality of communication layers, an example of which includes a point-to-point messaging protocol 224. The point-to-point messaging protocol 224 is used to implement secure communication between the first and second unified wallets 134, 140 and the institutional system 206, e.g., to exchange data used to obtain and receive decentralized identity data.

The semantic messages 226 exchanged between the first and second unified wallets 134, 140 and institutional system 206 (e.g., using the data store and message relay system 220 of the identity hub 204) contains semantically defined objects adherent to the schema 210. The message objects also contain data usable by the entities to evaluate requests, verify credentials, and execute value exchanges. The semantic message 226 is configurable as a JavaScript Object Notation (JSON) object, which is signed by each entity from a sending entity to the receiving entity for each segment of the resource transfer. The semantic message 226 is encrypted in one example and employs programming hooks that enable a message handler service to receive the semantic message 226 in real time at the identity hub 204 and process the messages as part of a data store and message relay system 220 in accordance with the semantics and rule set by the communication protocol 208 and schema 210 that are defined for a given message type. In this way, the identity data exchange is secured.

Figure 3:
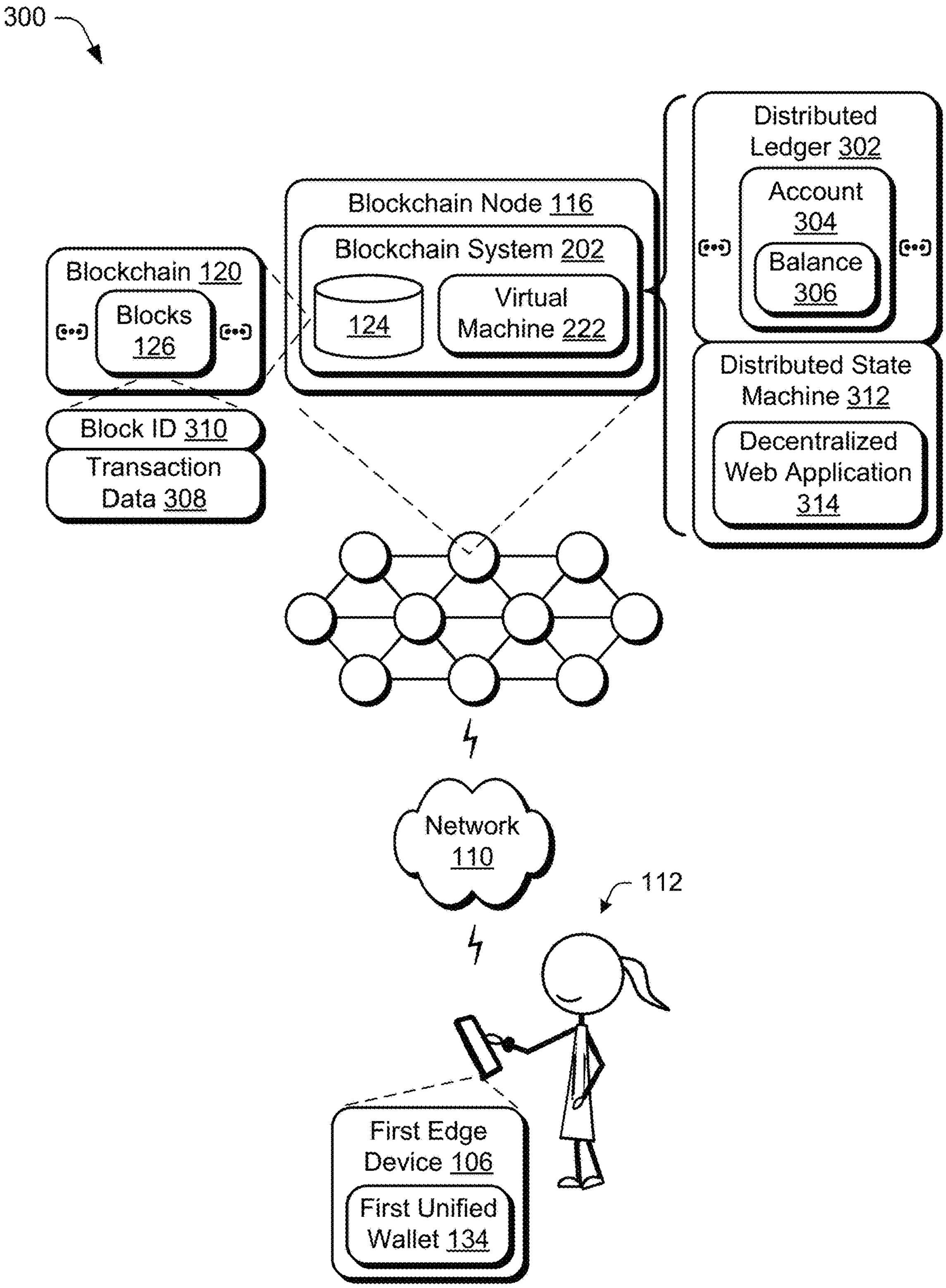
FIG. 3 is a non-limiting example showing operation of a blockchain node as part of a blockchain system of FIG. 3 according to an implementation of the present subject matter.

FIG. 3 is a non-limiting example 300 showing operation of a blockchain node 116 as part of a blockchain system 202 of FIG. 3 according to an implementation of the present subject matter. The blockchain system 202 implements a virtual machine 222 that is representative of a diverse range of functionality made possible by leveraging a blockchain 120. In a first such example, the virtual machine 222 implements a distributed ledger 302 of accounts 304 and associated balances 306 of those accounts 304. Distributed ledgers 302 support secure transfer of digital assets (e.g., tokens or coins of cryptocurrencies) between accounts 304. The secure transfer is performable without management by a central authority through storage (illustrated as storage 124) by blockchain nodes 116 of the blockchain system 202 as part of transaction data 308. The transaction data 308 is maintained as part of blocks 126 (and associated block IDs 310) of the blockchain 120.

Through synchronized and distributed access supported by the blockchain 120, changes to balances 306 (e.g., a number of tokens) are visible to any entity with access to the blockchain 120. Techniques are also implemented to support management of the balances 306 across the accounts 304, e.g., to enforce rules that a respective account 304 does not transfer more tokens than are available based on a balance 306 specified for that account 304.

In another example, the virtual machine 222 implements a distributed state machine 312 that supports execution of a decentralized web application 314. The distributed state machine 312 is implemented along with the transaction data 308 within the blocks 126 of the blockchain 120 such that the blocks 126 describe accounts and balances as described above for the distributed ledger 302. The transaction data 308 also supports a machine state, which can change from block to block of the blockchain 120. In one example, the decentralized web application 314 is executable as part of a "Turing-complete" decentralized virtual machine that is distributed across the blockchain nodes 116 of the blockchain system 202. As Turning-complete, the decentralized web application 314 is computationally universal to perform computing device operations, e.g., logic or computing functions. Thus, the decentralized web application 314 is executable by a processing system as software that is storable in a computer-readable storage medium of the blockchain nodes 116 to perform a variety of operations.

An example of the decentralized web application 314 is executable automatically and without user intervention (or with partial human interaction wherein desired) by the blockchain nodes 116 of the distributed state machine 312. Execution of the decentralized web application 314 includes obtaining data from a specified data source (e.g., devices, APIs, and so forth that are accessible via the network 110), and based on the data, initiating one or more operations based on conditions described in the decentralized web application 314.

In order to publish blocks for addition to the blockchain 120, a blockchain node 116 may be implemented as a "miner" to add a block of transactions to the blockchain 120. In one or more implementations, other blockchain nodes 116 may communicate transactions received at those nodes to one or more mining nodes for validation. Mining nodes may perform peer-to-peer computations to check if transactions intended for the blockchain 120 are valid and, if validated, may add validated transactions to a block 126 that those blockchain nodes are building. If the transactions are determined to be valid, for instance, then the transaction data 308 describing those transactions is encoded in or otherwise stored on a respective block 126, which is linked to the blockchain 120 such that the new block is "at the end" or "at the top" of the blockchain 120, e.g., through inclusion of a hash of a previous block in the chain.

The blockchain nodes 116 then broadcast this transaction history via the blockchain network 102 for sharing with other blockchain nodes. This acts to synchronize the blocks 126 of the blockchain 120 across the distributed architecture of computing devices. A variety of "types" of blockchain nodes 116 may be used to implement the blockchain 120. By way of example, the blockchain 120 may be implemented at least in part using "full" blockchain nodes, which are nodes that store an entirety of the blockchain 120, e.g., locally in computer-readable storage media of respective computing devices of the blockchain nodes. Other types of blockchain nodes may also be employed to implement additional functionality, such as for governing voting events, execution of protocol operations, rules enforcement, and so forth.

The blockchain 120 may be leveraged to provide a diverse range of functionality. Due in part to the distributed storage and updating of the blockchain 120 over the blockchain network 102, the blockchain 120 may store its data in a decentralized manner, without a centralized database (e.g., run by a clearinghouse), and thus operate as a distributed ledger. The decentralized storage of the blockchain 120 overcomes one of the disadvantages of centralized storage, which is that centralized storage essentially has a single point of failure. It is to be appreciated that in one or more implementations, the blockchain 120 may be public (e.g., like Bitcoin and Ethereum blockchains), such that transactions on the blockchain 120 are generally viewable with a connection to the Internet. Alternatively, the blockchain 120 may be configured as a private blockchain, in one or more implementations. When the blockchain 120 is a "private" blockchain, the computing devices used to implement the blockchain nodes may be controlled by a centralized authority, such as a company or a consortium of entities.

As a distributed ledger 302, the blockchain 120 supports the secure transfer of digital assets, such as the transfer of cryptographic tokens for a cryptocurrency. Often, cryptocurrencies (e.g., coins of the cryptocurrency) are the native assets to blockchains, whereas tokens are created "on top" of these blockchains. By way of example, the Bitcoin blockchain's native asset is (Bitcoin or "BTC"), a cryptocurrency. In one or more implementations, the blockchain network 102 corresponds to the Bitcoin blockchain. In variations, however, the blockchain network 102 may correspond to a different blockchain network (e.g., the Ethereum blockchain) or a combination of blockchain networks. It is to be appreciated that the described techniques may be used to optimize routing within a decentralized network (e.g., the decentralized network 104) for various digital instruments, including, by way of example and not limitation, cryptocurrencies (e.g., Bitcoin (BTC), Ether (ETH), Ripple (XRP), etc.) and tokens (e.g., non-fungible tokens (NFTs), smart contracts, digital rights management (DRM) mechanisms associated with digital content, mechanisms for shipping and logistics, etc.).

Unified Cryptographic Wallet

The following discussion describes unified wallet techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks.

Figure 4:
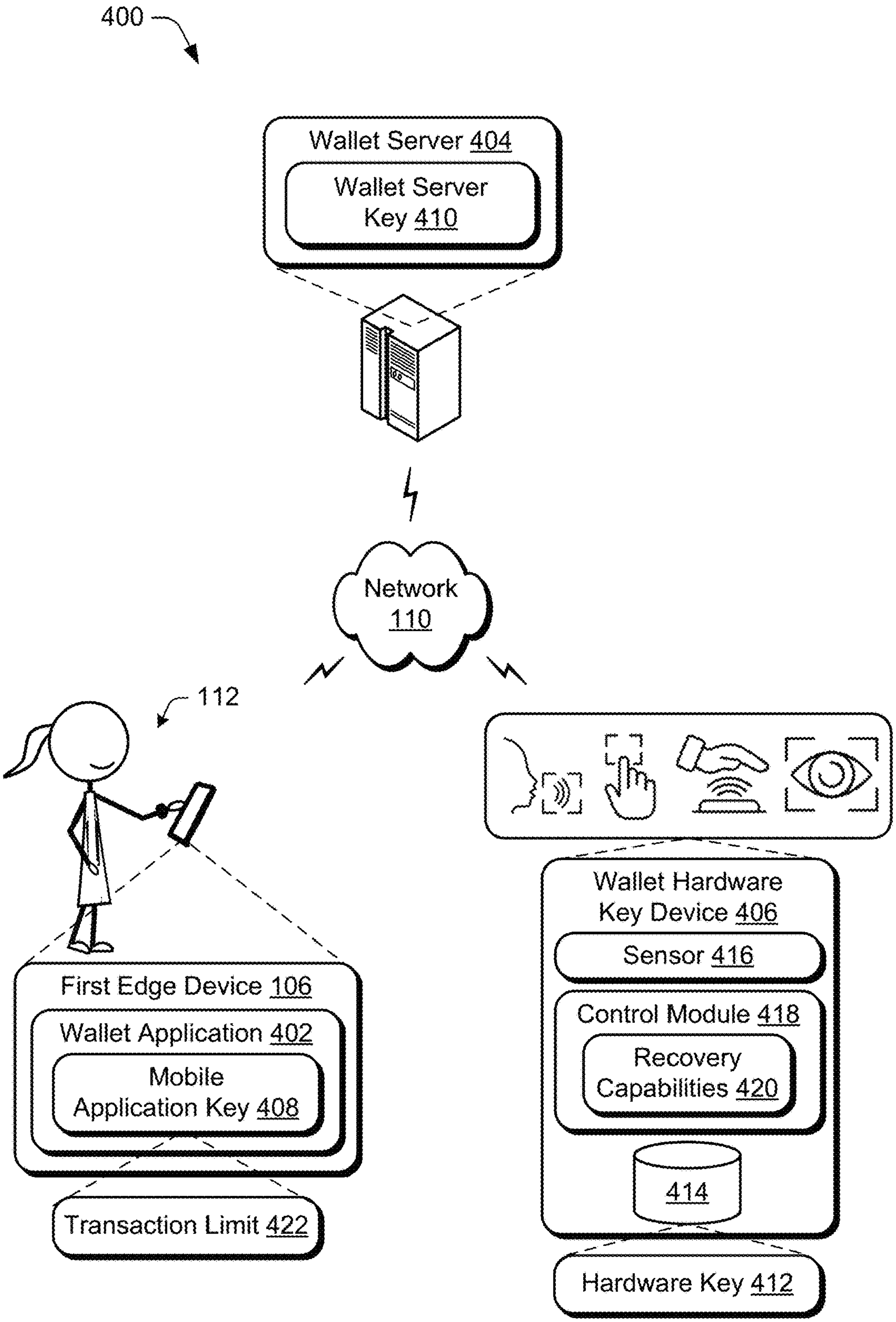
FIG. 4 is a non-limiting illustration of an example system that is operable to implement security mechanisms using cryptographic keys in support of a unified wallet as described herein according to an implementation of the present subject matter.

FIG. 4 is a non-limiting illustration of an example system 400 that is operable to implement security mechanisms using cryptographic keys in support of a unified wallet as described herein according to an implementation of the present subject matter. The example system 400 includes the first edge device 106 as associated with the first entity 112.

Implementation of the unified wallet is achieved in this example through use of a wallet application 402, a wallet server 404, and a wallet hardware key device 406. Each of these entities includes a respective cryptographic key that is usable to authorize a resource transfer using a "two-of-three" security technique. The wallet application 402, for instance, includes a mobile application key 408, the wallet server 404 includes a wallet server key 410, and the wallet hardware key device 406 includes a hardware key 412 maintained locally in a storage device 414.

Figure 5:
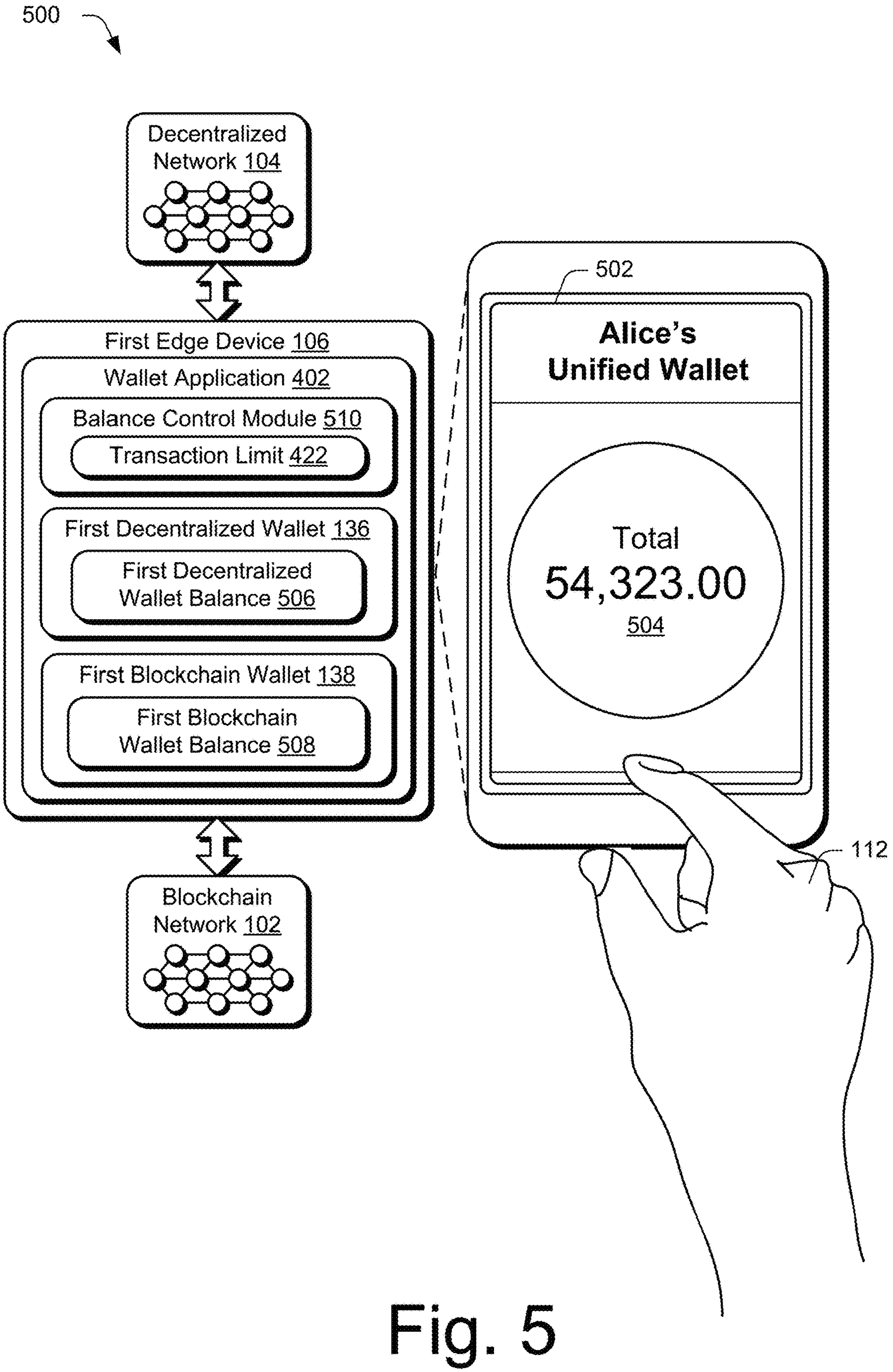
FIG. 5 is a non-limiting illustration of an example system that is operable to output a user interface having a unified balance of a unified wallet as described herein according to an implementation of the present subject matter.
Figure 8:
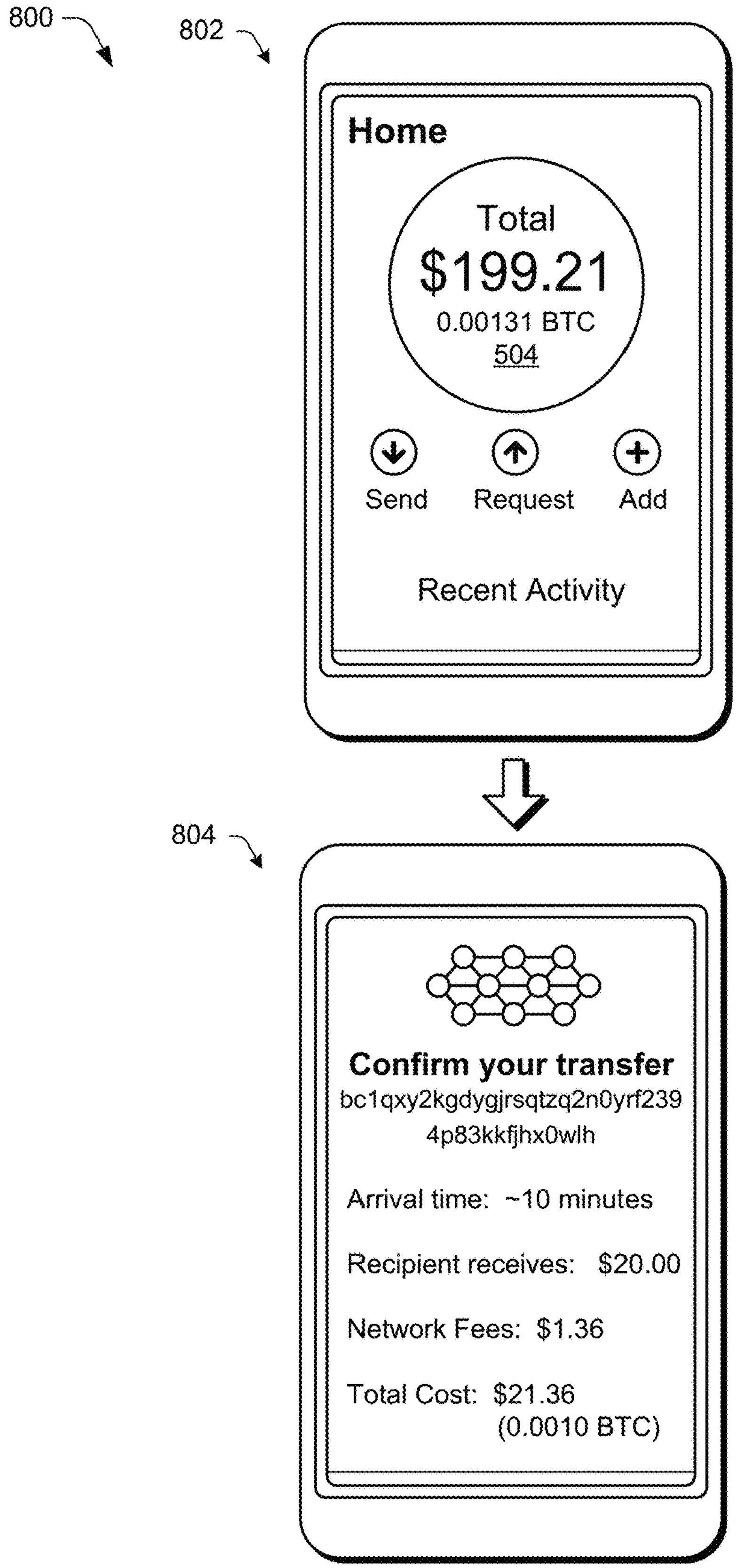
FIG. 8 is a non-limiting illustration of an example of a first user interface showing a unified balance and usable to initiate a transaction and a second user interface confirming performance of the transaction as described herein according to an implementation of the present subject matter.

The three parts of the unified wallet have different permissions and optionality built-in to allow the first entity 112 to use self-serve tools in a way that fits with corresponding desires and supports variation across different geographic settings. The wallet application 402 is operable as a mobile application executed on the first edge device 106 (e.g., a mobile phone of the first entity 112) that outputs a user interface (examples of which are illustrated in FIGS. 5 and 8) to enable the first entity 112 to safely own and manage cryptographic tokens, while finding partners in order to buy/sell/convert between fiat currencies and cryptographic currencies.

In an implementation, the wallet server 404 further includes functionality of a decentralized service provider that runs as a node that peers directly with a node that is executed as part of a unified wallet on an edge device. The decentralized service provider is configured to route payments on the entity's behalf through the decentralized network 104. The decentralized service provider may be executed as part of the wallet server 404 or separately by a third-party system. Signing and transaction features are implemented by the wallet server 404.

The wallet hardware key device 406 is implemented to add additional layers of security as part of the unified wallet. The wallet hardware key device 406, for instance, includes a sensor 416 that is configured to receive inputs that are usable to uniquely identify the first entity 112, e.g., via spoken utterance, a pin, a fingerprint scanner, palm reading, eye reading, and so forth. Inputs received via the sensor 416 are used by a control module 418 to permit or restrict access to the hardware key 412 maintained in the storage device 414. The control module 418 also includes recovery capabilities 420, e.g., in case the first entity 112 loses the first edge device 106 and therefore access to the wallet application 402. The wallet hardware key device 406, for instance, is usable to prove ownership of corresponding hardware (e.g., the first edge device 106) which is then usable to provision the mobile application key 408 and wallet application 402 on the first edge device 106. A fingerprint sensor, for example, of the wallet hardware key device 406 is usable to authenticate the identity of the first entity 112 before the wallet hardware key device 406 interacts with a near-field-communication (NFC) field of the first edge device 106 in order to sign a transaction with the mobile application key 408 in the wallet application 402. In another example, a PIN is entered using the wallet application 402 and is then communicated using NFC to the wallet hardware key device 406 to unlock the device.

The unified wallet secures funds through use of the mobile application key 408, the wallet server key 410, and the hardware key 412. In a "two-of-three" security mechanism, two out of the three keys are utilized to permit a fund transfer as part of a transaction, i.e., by signing the transaction. This security mechanism is enforced by the blockchain network 102. Access to these keys is protected by corresponding access mechanisms. For the mobile application key 408, for instance, access is protected through access techniques used to access the first edge device 106 itself and may also include a PIN or passphrase. For the hardware key 412, access is protected through use of the sensor 416 and control module 418, e.g., using biometric techniques of the wallet hardware key device 406 in which data identifying the first entity 112 is maintained locally and not exposed outside of the device. For the wallet server key 410, this key is maintained by a wallet server 404, e.g., by a third party separate from the first entity 112. Consequently, as a "two-of-three" security mechanism, fund transfers are permitted without the wallet server 404 and corresponding wallet server key 410 through use of the mobile application key 408 and the hardware key 412.

In an example of a transaction involving a relatively small amount of funds, a transaction is initiated by the wallet application 402, which is then signed by the wallet server key 410. As such, the first entity 112 is able to perform the transaction while keeping the wallet hardware key device 406 "safely tucked away" as reserved for the recovery capabilities 420 and/or for relatively larger transactions, e.g., above a transaction limit 422 as set by the wallet application 402 and enforced by the wallet server 404.

Access to the hardware key 412 in the wallet hardware key device 406 is protected (e.g., by biometric data or PIN) and acts as but one part of the unified wallet. Another part of the unified wallet is implemented by the wallet application 402. Both the wallet application 402 and the wallet hardware key device 406 are configurable to work together in physical proximity (e.g., via NFC) to move larger amounts of funds, e.g., an amount that is over a transaction limit 422.

In an implementation, the wallet application 402 outputs a user interface, via which, the first entity 112 enters a value to set the transaction limit 422, entry of which is verified using the wallet hardware key device 406. The transaction limit 422 is then utilized by the wallet server key 410 to permit or restrict transactions based on which keys are received in a request to initiate a transaction and an amount of the transaction. For a transaction over the transaction limit 422, for instance, the wallet server 404 permits the transaction if signed by both the mobile application key 408 and the hardware key 412. For an amount under the transaction limit 422, the transaction is permitted if signed by the mobile application key 408, i.e., the wallet server 404 then signs the transaction using the wallet server key 410. In order to change the transaction limit 422 in one example, both the wallet application 402 and the wallet hardware key device 406 are utilized.

The unified wallet is also configurable to specify that both the wallet application 402 and mobile application key 408 as well as the wallet hardware key device 406 and hardware key 412 are to be used for each transaction, regardless of size, for additional security. On the other hand, the unified wallet is also configurable to permit any size of transaction without use of the wallet hardware key device 406. The wallet hardware key device 406 in this scenario is then used to recover keys in case the first edge device 106 and corresponding wallet application 402 are lost through use of the recovery capabilities 420.

Through use of the "two-of-three" security mechanism, a third party (e.g., associated with the wallet server 404) is not able to transfer funds, rather the first entity 112 is given true ownership as having two of the three keys. The wallet server key 410 is usable by the wallet server 404 to cooperate in wallet recovery (e.g., in case the first edge device 106 or wallet hardware key device 406 is lost) or sign transactions initiated by the wallet application 402 and signed using the mobile application key 408.

If the first edge device 106 is lost, the unified wallet is recoverable using the wallet application 402 as executed on a new edge device and the wallet hardware key device 406. The first entity 112, for instance, unlocks the wallet hardware key device 406 using a fingerprint or PIN to expose the hardware key 412. If the wallet hardware key device 406 is lost (alone or along with the first edge device 106), the unified wallet is recoverable based on security settings defined by the first entity 112 when setting up the unified wallet.

FIG. 5 is a non-limiting illustration of an example system 500 that is operable to output a user interface having a unified balance of a unified wallet as described herein according to an implementation of the present subject matter. The example system 500 includes the first edge device 106 as associated with the first entity 112.

The wallet application 402 outputs a user interface 502 that describes a unified balance 504 representing a value of an entirety of cryptographic tokens held by the first entity 112 in the decentralized network 104 and the blockchain network 102. The first decentralized wallet 136, for instance, is used to determine a first decentralized wallet balance 506 of cryptographic tokens associated with first entity 112 as part of the decentralized network 104, e.g., through respective APIs. Likewise, a first blockchain wallet 138 is used to determine a first blockchain wallet balance 508 of cryptographic tokens associated with first entity 112 as part of the blockchain network 102. A balance control module 510 is implemented to control transfer of funds between the first decentralized wallet 136 and the first blockchain wallet 138 "behind the scenes" as part of liquidity management as further described below as well as to locally implement the transaction limit 422.

As illustrated, the wallet application 402 provides a unified balance 504 that is used to sending or receiving funds as part of a transaction, which is protectable using a two-of-three security mechanism or other security mechanism to ensure funds that are "on chain" as part of the blockchain network 102 and "off chain" on the decentralized network 104 remain secure. Upon initiating a transaction, the unified wallet (e.g., the wallet application 402 and/or the wallet server 404) is configurable to determine which network (e.g., the decentralized network 104 or the blockchain network 102) is to be used to perform the transaction, automatically and without user intervention "in the background," an example of which is described in the following discussion and shown in a corresponding figure.

Figure 6:
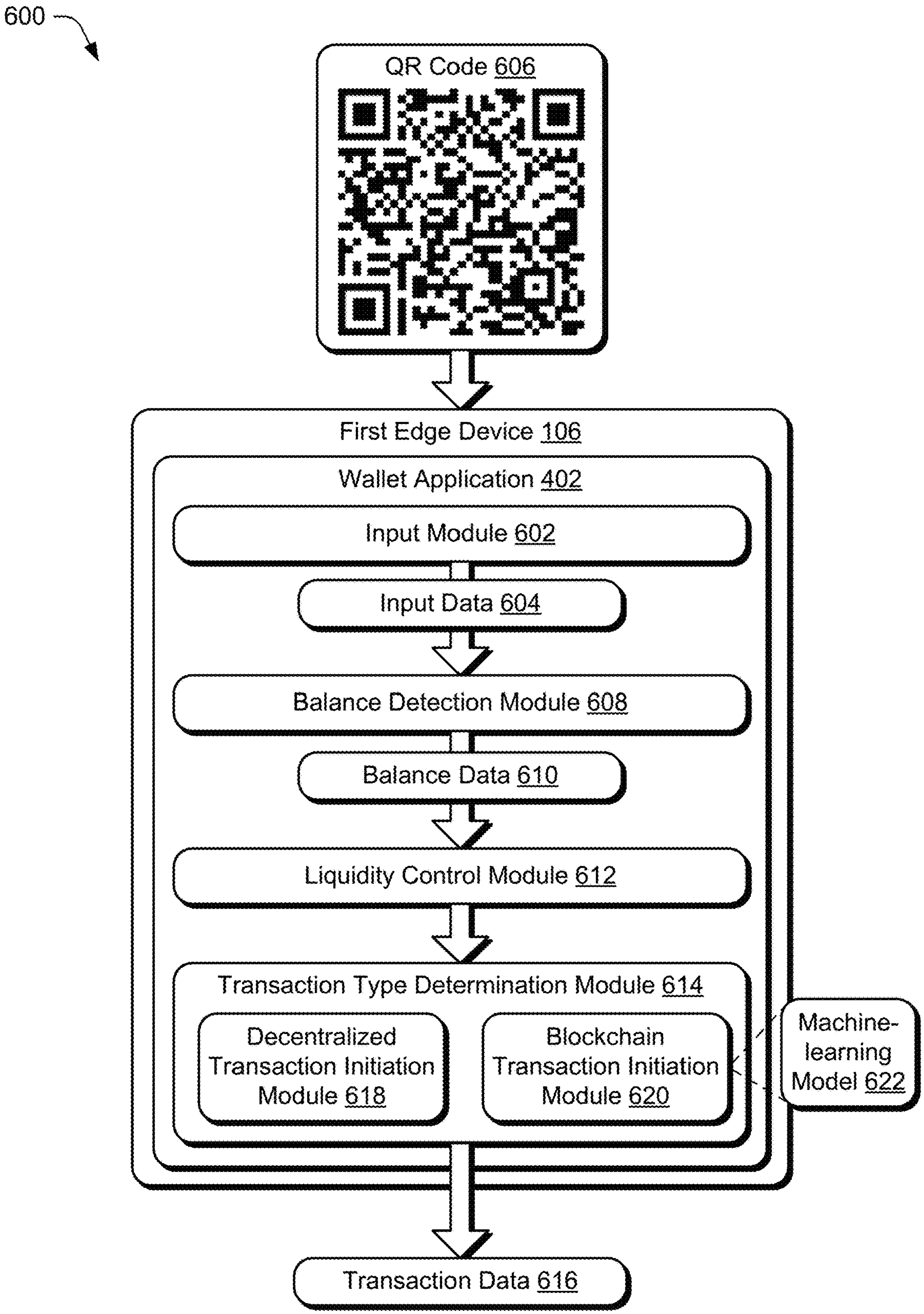
FIG. 6 is a non-limiting illustration of an example system showing operation of a wallet application in greater detail as determining which network to utilize in order to perform a transaction as described herein according to an implementation of the present subject matter.
Figure 7:
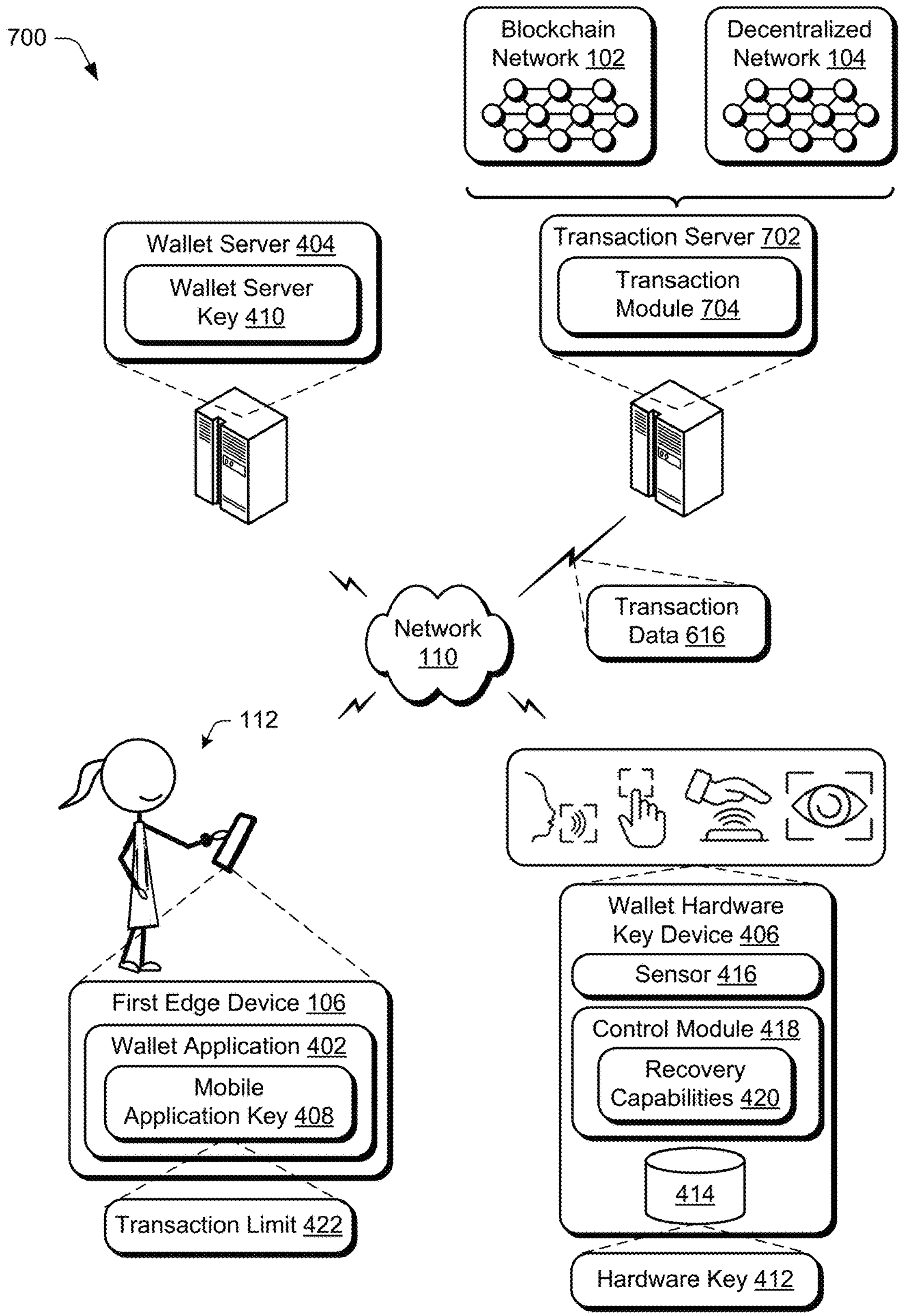
FIG. 7 is a non-limiting illustration of an example system showing communication of transaction data generated in FIG. 6 to a transaction server to perform a transaction using a transaction module over a selected blockchain network or decentralized network as described herein according to an implementation of the present subject matter.

FIG. 6 is a non-limiting illustration of an example system 600 showing operation of a wallet application in greater detail as determining which network to utilize in order to perform a transaction as described herein according to an implementation of the present subject matter. FIG. 7 is a non-limiting illustration of an example system 700 showing communication of transaction data generated in FIG. 6 to a transaction server 702 to perform a transaction using a transaction module 704 over a selected blockchain network 102 or decentralized network 104 as described herein according to an implementation of the present subject matter.

The wallet application 402 in this example employs an input module 602 to generate input data 604 in order to initiate a transaction. The input module 602, for instance, is configurable to receive user inputs via a user interface. In another example, the input module 602 is used to scan a QR code 606 that specifies payment information, e.g., as unified payment information for decentralized network and blockchain network.

A balance detection module 608 is then utilized to generate balance data 610 describing a respective balance of cryptographic tokens available via respective networks, e.g., determine the first decentralized wallet balance 506 of the first decentralized wallet 136 and the first blockchain wallet balance 508 of the first blockchain wallet 138.

A liquidity control module 612 is also employed to determine an amount of liquidity to be made available in order to perform the transaction. The liquidity control module 612 is configurable, automatically and without user intervention, to transfer funds between the blockchain network 102 and decentralized network 104 in order to support the transaction as further described in relation to FIG. 10.

A transaction type determination module 614 is then utilized to generate transaction data 616 to initiate the transaction, which also includes functionality to select which network is to be used to perform the transaction, e.g., the blockchain network 102 or the decentralized network 104. Functionality to do so is represented by a decentralized transaction initiation module 618 and a blockchain transaction initiation module 620. The transaction data 616 is then communicated to a transaction server 702 that corresponds to the blockchain network 102 or decentralized network 104 selected by the wallet application 402.

Selection of layer 1 or layer 2 networks is usable to address a variety of considerations. Fees on a layer 2 network, for instance, may be set as a percentage of value, therefore the bigger the transfer, the higher the fee. As a result, there is a point at which a transfer of funds on a layer 1 network is cheaper to perform than on a layer 2 network. There are also tradeoffs between time and cost, e.g., cheaper and slower versus faster and expensive. Accordingly, in this example it is generally cheaper and faster to transfer funds on a level 2 network for lower amounts. An ability to select the network by the wallet application 402 and/or wallet server 404 is made possible due to liquidity that is made available on both networks through use of the unified wallet, which is not possible in conventional techniques. In an implementation, a machine-learning model 622 is trained and retrained over time to make this selection, e.g., based on subsequent use of funds by a respective entity (and therefore determine an amount of urgency for the transaction), network responsiveness, and so forth.

Consider a scenario in which the first entity 112 opens a unified wallet. As part of the setup process, the first entity 112 uses partnership integration to purchase a first cryptographic token, e.g., from an institutional system 206. A channel is also provisioned, automatically and without user intervention, on the decentralized network 104. At a retail location, a QR code 606 is displayed to pay using cryptocurrency. The wallet application 402, once used to scan the QR code 606, recognizes the QR code 606 as an embedded decentralized network 104 invoice, and instantly swaps liquidity into the channel on the decentralized network 104 using the liquidity control module 612 to pay the invoice without the first entity 112 being made aware that the decentralized network 104 was used.

In another example, a retailer indicates that cryptocurrency is available, and an address is copied that is usable as part of the blockchain network 102 to make payments. In order to make the payment, the wallet application 402 recognizes the address as involving liquidity on the blockchain network 102 and automatically and without user intervention splices out a payment amount to send on the decentralized network 104, again without the first entity 112 being made aware that the decentralized network 104 was used.

In a further example, a transaction involves a transfer of funds from the second entity 114 to the first entity 112. To do so, the wallet application 402 displays a QR code 606 in a user interface that is scanned by the second edge device 108. The QR code 606 in this example contains both layer 1 network (e.g., blockchain network 102) and layer 2 network (e.g., decentralized network 104) payment information. Based on the size of the transaction, the second unified wallet 140 infers that use of the decentralized network 104 is both cheaper and faster, and therefore transfers funds using the decentralized network 104. In this example, neither the first entity 112 nor the second entity 114 may be aware of which network is used to implement the transaction.

Accordingly, a single unified balance 504 is supported by the unified wallet to hold funds. In order to promote liquidity in one example, funds are maximized in the decentralized network 104 in order to minimize fees for transfers, reduce an amount of time used to perform the transaction, and increase privacy. When sending or receiving funds, the unified wallet (e.g., the wallet application 402 and/or the wallet server 404) automatically chooses an optimal network for sending, receiving and paying funds as part of a transaction.

FIG. 8 is a non-limiting illustration of an example 800 of a first user interface 802 showing a unified balance and usable to initiate a transaction and a second user interface 804 confirming performance of the transaction as described herein according to an implementation of the present subject matter. The first user interface 804 includes the unified balance 504 as previously described, which unifies the first decentralized wallet balance 506 and the first blockchain wallet balance 508. The first user interface 802 also includes options to initiate the transaction, examples of which include "send" and "request" as well as an option to "add" a contact.

The second user interface 804 is configured to confirm the transaction. The second user interface 804 includes an identifier of the cryptographic token, an amount of time to perform the transaction, an amount of fund received by the recipient, network fees, and total cost as indicate using a fiat currency and a cryptocurrency, e.g., Bitcoin (BTC).

Figure 9:
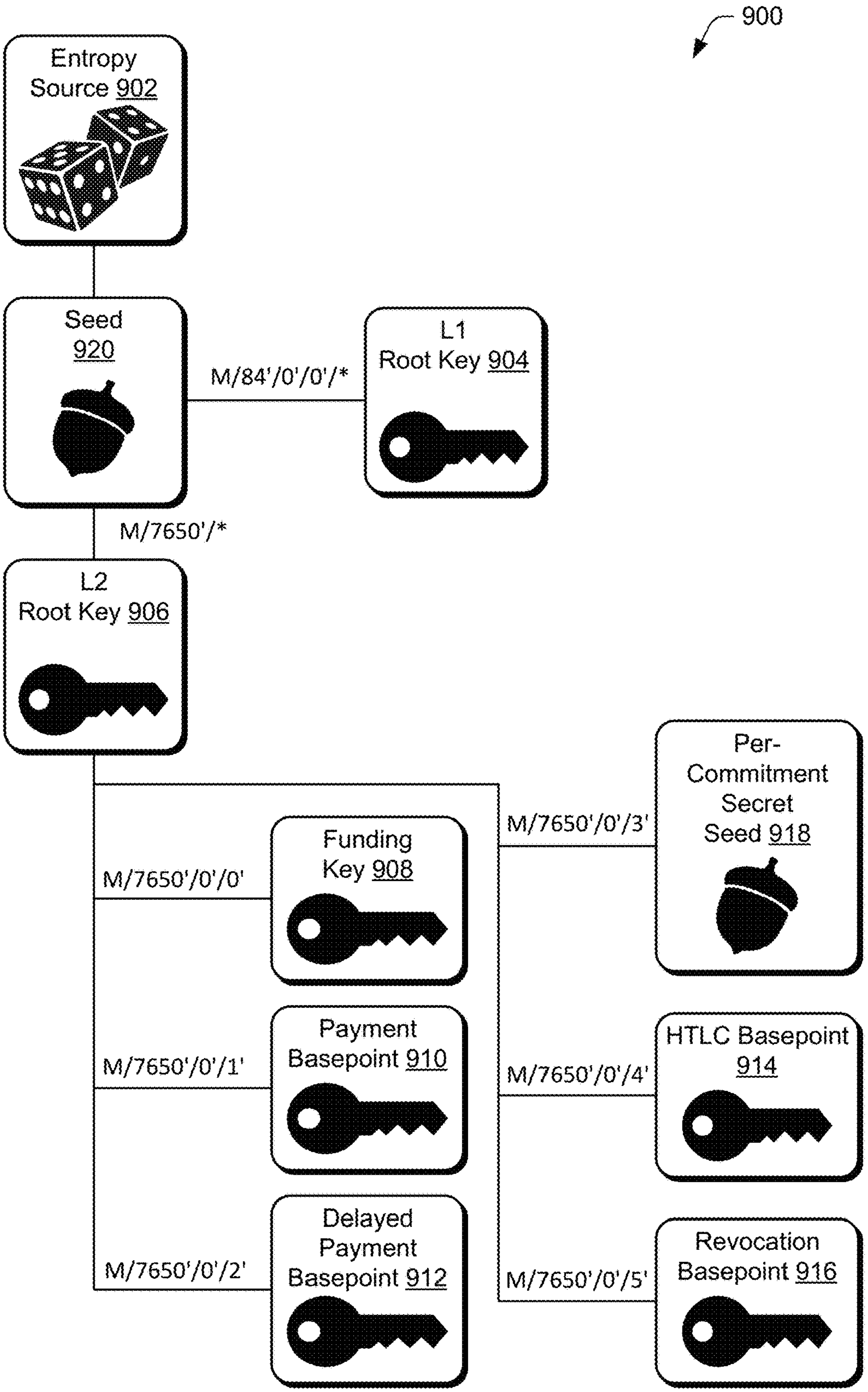
FIG. 9 is a non-limiting illustration of an example architecture of key management and derivation for a layer 1 network that is extended to support a layer 2 network as described herein according to an implementation of the present subject matter.

FIG. 9 is a non-limiting illustration of an example architecture 900 of key management and derivation for a layer 1 network that is extended to support a layer 2 network as described herein according to an implementation of the present subject matter. This architecture supports key management and liquidity for sending and receiving transactions across both a layer 1 network (e.g., blockchain network 102) and a layer 2 network, e.g., decentralized network 104. The architecture 900 includes an entropy source 902 used to generate the keys.

The architecture 900 includes the following inventory of secrets:

- L1 root key 904, which is a key from which each other L1 key is derived;
- L2 root key 906, which is a key from which each other L2 key is derived;
- Funding key 908, which is an L2 key used to create channels;
- Payment basepoint 910, which is an L2 key used to derive keys to receive fund when the channel is closed;
- Delayed payment basepoint 912, which is an L2 key used to derive keys to receive funds when the channel is closed by the unified wallet;
- Hashed Timelock Contract (HTLC) basepoint 914, which is an L2 key used to derive keys for receiving HTLC outputs;
- Revocation basepoint 916, which is an L2 key used to derive keys that are used by the unified wallet to taken funds in the channel in the even that a revoked transaction is broadcast;
- Per-commitment secret seed 918 which is an L2 seed that is used to derive per-commitment secrets that are disclosed when a transaction is revoked;
- Counterparty secret storage, which is an L2 data structure for compactly storing per-commitment secrets; and
- Payment hash preimage, which is an L2 preimage that is used to receive HTLC outputs.

Commitment output keys may be secured with (1) a two-of-three set of signers using multi-party communication or (2) a custom script. On the other hand, the funding key is secured, in one example, solely using a two-of-three set of signers using multi-party communication. In an alternative, the funding key does not use two-of-three security but rather restricts a wallet's access to the wallet server 404 on the behalf of the entity 112. The wallet server 404 is then tasked with asking for an attestation from the wallet hardware key device 406 for high-risk scenarios.

For transportability, the keys are derived from a single seed 920. Recovering a backed-up seed allows each of the secrets to be derived that were created with that seed. In an implementation, the seed 920 is implemented using BIP32 to create a key tree with branches for both L1 and L2. The L2 keys use BIP84 derivation paths. In the illustrated example, the L2 keys use "7650" as a purpose index, which in concatenated ASCII code refers to "L2." The L2 root key 906 uses a separate index for each channel session for use in deriving a fresh set of keys for each session. For example, the first channel session keys are derived at the derivation path "m/7650'/0'/*" and subsequent session keys are derived at "m/7650'/1'/*."

In one example, the wallet application 402 is used to generate L2 keys, solely. Both the wallet hardware key device 406 and the wallet server 404 use BIP84 key derivation and do not generate L2 keys. However, the wallet server 404 participates in generating a payment hash preimage using a multi-party hashing protocol described below.

When receiving a payment over L2, the unified wallet generates a secret that is used as a locking mechanism as part of a hash time locked contract (HTLC) that supports an atomic transaction such that funds are not moved unless each of the payment operations in the transaction succeed. In the case of a routed payment, the atomicity causes each of the payments along the route to fail if the payment does not reach a terminal payee, and in the case of a swap, enables intermediate operations in the swap to reverse unless both L1 and L2 operations succeed.

The secret is hashed and the hash is embedded in the HTLC output, and therefore the secret is referred to as a payment hash preimage. If a counterparty learns the preimage prior to the atomic transaction completing, atomicity fails by allowing the counterparty to take the funds in the output without completing further operations.

To defend against attacks against the payment hash preimage, block processing properties are utilized to implement a protocol in which multiple parties contribute to a mid-state of the hashing function, such that the hash is computed over multiple preimages. Using this multi-party hashing protocol, the wallet application 402 and the wallet server 404 work together to create the payment hash. To reveal the preimage, the wallet application 402 requests the wallet server's 404 preimage, combines the preimage with a preimage of the wallet application 402, derives a payment hash preimage, and reveals the payment hash preimage for a cooperative channel update, or utilizes the payment hash preimage to redeem an HTLC unspent transaction output (UTXO) if a cooperative update is not available and the channel is closed. The wallet server 404 also sends an encrypted copy of its preimage to the wallet application 402, which may be configured to be decrypted by the wallet hardware key device 406, solely, in the event that wallet server 404 is unavailable.

If an attacker gains control of the wallet application 402, then the attacker could request the preimage from the wallet server 404 to gain access to the payment hash preimage. To defend against this attack, the wallet server 404 is configured to refuse to provide a preimage for risky or suspicious transactions without an attestation from the wallet hardware key device 406. In an implementation, the block size is sixty-four bytes, so a minimum size preimage is set as 128 bytes in an example implementation to allow each party to contribute a full 64-byte block of data. The mid-state is not generated until an entirety of the sixty-four bytes of block data is provided, and the security of the protocol specifies the mid-state is transferred between the parties and not the preimage itself.

When a channel closes on the decentralized network 104 (i.e., the layer 2 network), the transaction server 702 pays out to a set of keys based upon pre-committed scripts. These commitments are encoded in a commitment transaction. A protocol of the decentralized network 104 specifies that the outputs for the commitment transaction each pay to a single key, and in some cases also specify use of a preimage to a payment hash.

In an implementation, a commitment transaction is built that pays to a threshold of keys, such as "two-of-three," instead of a single key. In other techniques, output is limited to a single key due to the overhead of negotiating complex scripts with different types of key configurations. However, in this implementation, the unified wallet is limited to direct peers to allow for a commitment transaction with outputs that have "two-of-three" spending conditions and provides flexibility to secure payment outputs with multiple signatures.

Figure 10:
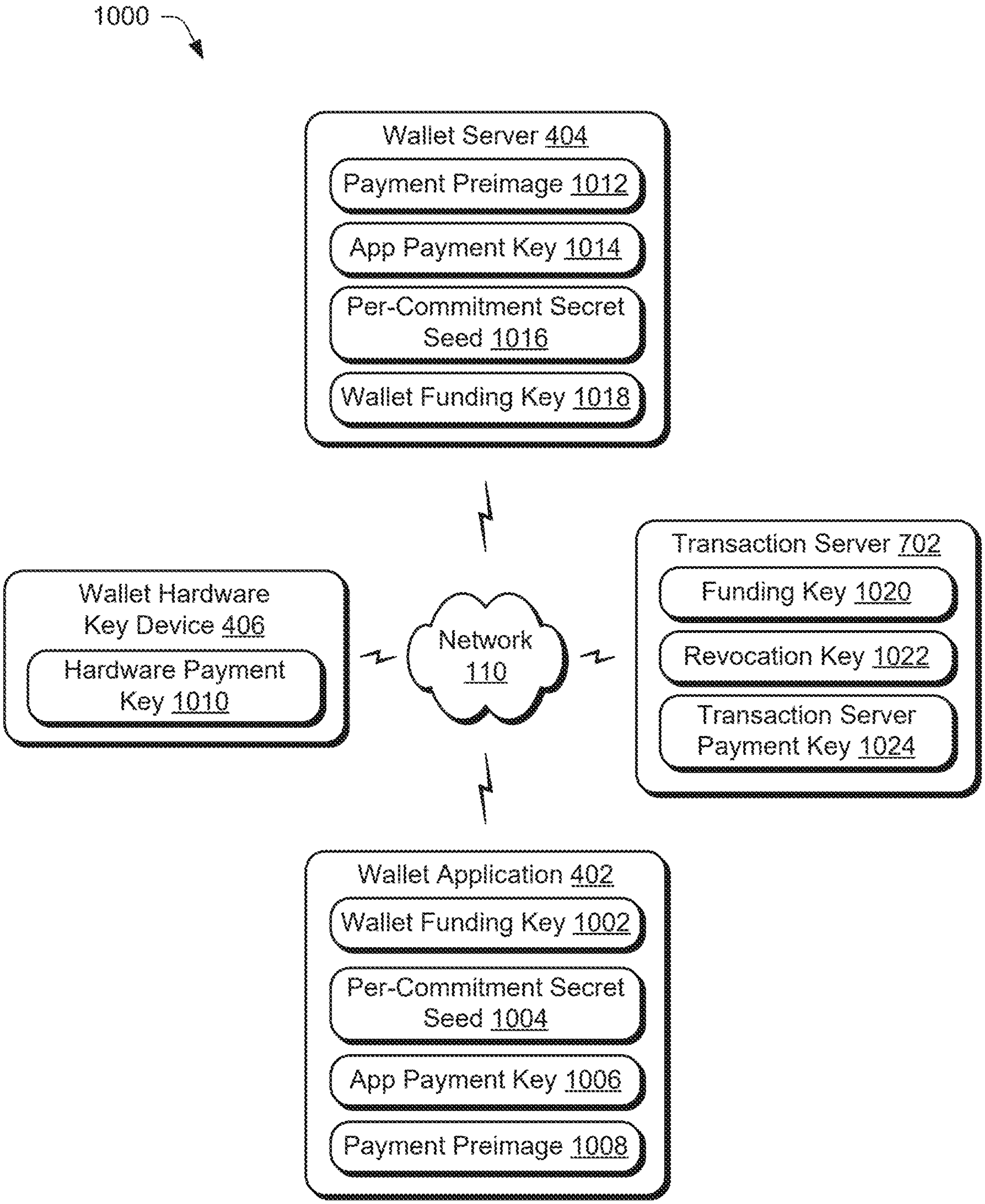
FIG. 10 is a non-limiting illustration of an example system showing key management by a wallet application, wallet server, wallet hardware key device, and transaction server as described herein according to an implementation of the present subject matter.

FIG. 10 is a non-limiting illustration of an example system 1000 showing key management by a wallet application 402, wallet server 404, wallet hardware key device 406, and transaction server 702 as described herein according to an implementation of the present subject matter. The wallet application 402 includes a wallet funding key 1002, per-commitment secret seed 1004, app payment key 1006, and payment preimage 1008. The wallet hardware key device 406 includes a hardware payment key 1010. The wallet server 404 includes a payment preimage 1012, an app payment key 1014, a per-commitment secret seed 1016, and a wallet funding key 1018. A transaction server 702 includes a funding key 1020, revocation key 1022, and a transaction server payment key 1024.

As previously described, there is no single L2 key that is usable to spend funds, just as is the case with L1. Accordingly, an attacker is challenged with successfully compromising both the wallet funding key 1002, which is secured by the wallet application 402, and wallet funding key 1018 that is secured by the wallet server 404 to transfer funds in the channel.

Even without access to the funding key 1020 of the transaction server 702, an attacker could use the wallet funding key 1002 to make a request to the transaction server 702 to make a payment over the decentralized network 104. If an attacker has the wallet funding key 1002, then the attacker can sign an updated commitment transaction with an HTLC that contains a payment hash preimage known to the attacker, or splice-out payments to attacker-controlled L1 addresses. The attacker can then attempt to impersonate the unified wallet and make a request to the transaction server 702 to forward the funds.

There are a few mitigations to defend against this attack: (1) restricting API access to the transaction server 702 for channels associated with the unified wallet and (2) wallet server 404 enforced spending limits, i.e., the transaction limit 422.

The first mitigation prevents knowledge of the wallet funding key 1002 alone to be sufficient for an attacker because an attacker would not be able to connect to the API of the transaction server 702 to request a transaction unless the attacker had access to the transaction server 702 infrastructure. An example of restricting access includes use of subnet-level access control lists.

The second mitigation defends against an attacker who both learns the wallet funding key 1002 and has also compromised the wallet application 402. If the wallet application 402 is compromised, then the wallet application 402 could be used to make a payment request to the API of the transaction server 702. This is a similar scenario to an attacker gaining access to the wallet application 402 and making a request to the transaction server 702 to make an L1 payment. A similar mitigation may be used for "large" transactions, in which the wallet server 404 refuses to make a request to the API of the transaction server 702 without an attestation by the wallet hardware key device 406.

Each time a channel state is updated, a per-commitment secret is exposed to the transaction server 702. This secret can be used by the transaction server 702 to derive a revocation key 1022 that is able to spend an entirety of the funds in the channel, including the entity's funds. This provides a mechanism to credibly revoke prior states by giving the channel counterparty the ability to punish the publication of a revoked state. As with the funding key, an attack on both the per-commitment secret and the revocation key 1022 is analogous to an attack on the wallet application 402 and wallet server 404, and similarly this creates a reliance on the security of the transaction server 702.

Figure 11:
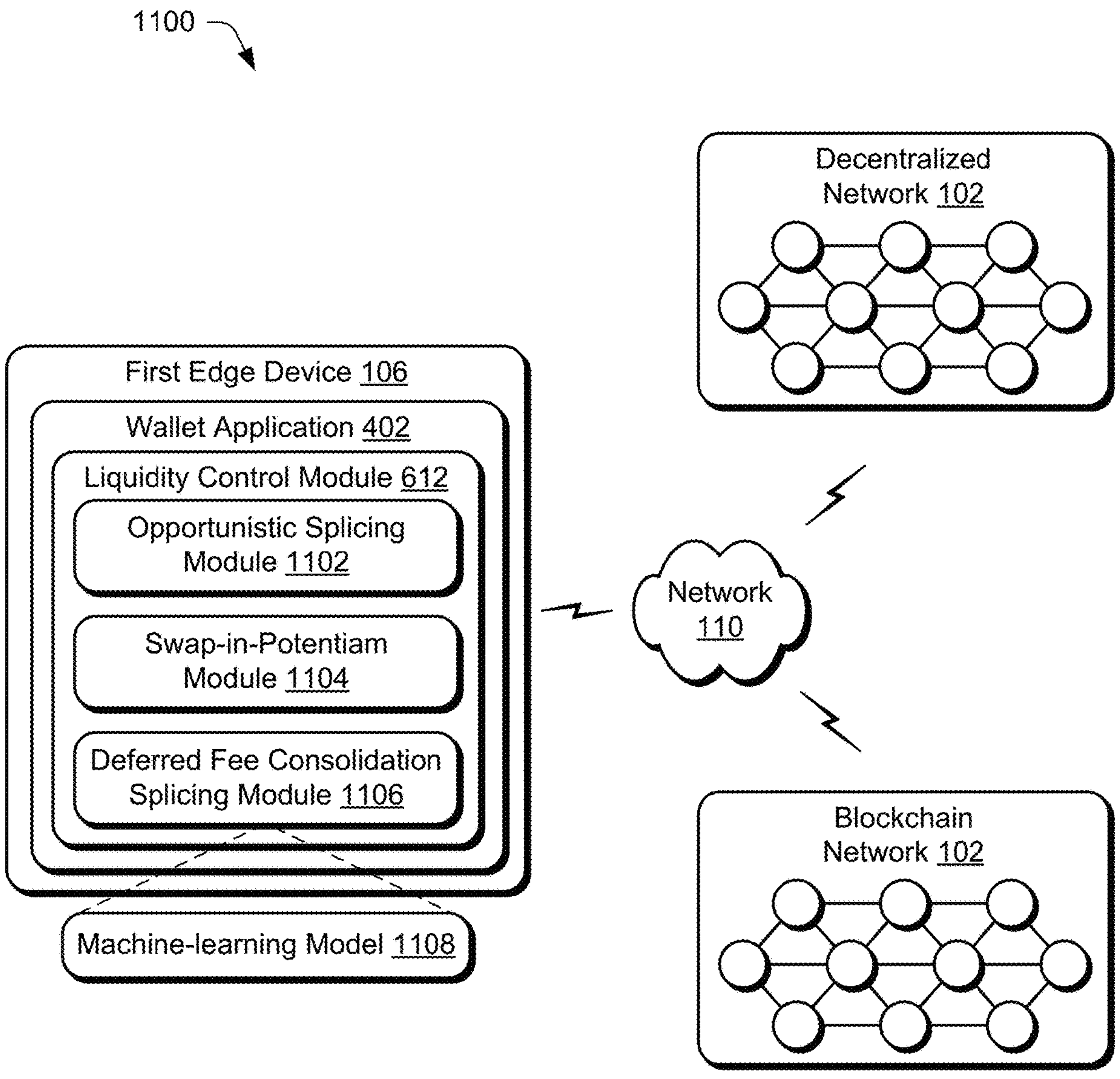
FIG. 11 is a non-limiting illustration of an example of implementation of a liquidity mechanism by a wallet application as described herein according to an implementation of the present subject matter.

FIG. 11 is a non-limiting illustration of an example 1100 of implementation of liquidity mechanism by a wallet application as described herein according to an implementation of the present subject matter. In the illustrated example, the wallet application 402 implements a liquidity control module 612 to control an amount of funds and thus "liquidity" of different types of cryptographic tokens, e.g., as utilized by the blockchain network 102 and the decentralized network 104. Examples of functionality to do so are represented by an opportunistic splicing module 1102, a swap-in-potentiam module 1104, and a deferred fee consolidation splicing module 1106.

In a first example as implemented by the opportunistic splicing module 1102, a transaction as performed using the unified wallet is opportunistically spliced with other transactions. Each time an "on chain" transaction is performed, delay and corresponding fees are incurred. Therefore, in this example a unified wallet transaction performs a fund transfer in conjunction with other fund transfers that are also being performed by "splicing" on these other transactions.

For example, whenever L1 funds are sent, any remaining L1 funds are spliced into the L2 channel in the same transaction. In another example, whenever L1 funds are swept during a recovery, funds are spliced into the L2 channel as part of the same recovery transaction whenever the transaction server 702 uses a splice to modify the inbound liquidity of the channel, any L1 funds are also spliced into the channel as part of the same splice transaction. In each of these instances, an on-chain fee is already incurred, so the movement from L1 to L2 does not incur additional cost.

In a second example as implemented by a swap-in-potentiam module 1104, a "time lock" is employed as part of the transaction. The time lock, for instance, is utilized as part of the "two-of-three" security technique, such that after expiration of the time lock the funds are free to spend. The time lock is usable to protect against double spending. Double spending, for instance, is an attack again the wallet server 404. Accordingly, a time-lock allows a swap to be facilitated while the lock is in place. When the lock expires, a swap is no longer permitted.

In a third example as implemented by a deferred fee consolidation splicing module 1106, funds are proactively moved to maintain liquidity. The fee is subsidized and then paid upon performance of a transaction. In an implementation, machine learning techniques are utilized through a machine-learning model 1108 to set parameters for the subsidy and transaction, e.g., based on fee outlay, liability, temporal considerations, and so forth. Other examples are also contemplated, e.g., in which the wallet application checks for funds upon initial execution, and automatically moves funds to provide sufficient liquidity for both networks.

Figure 12:
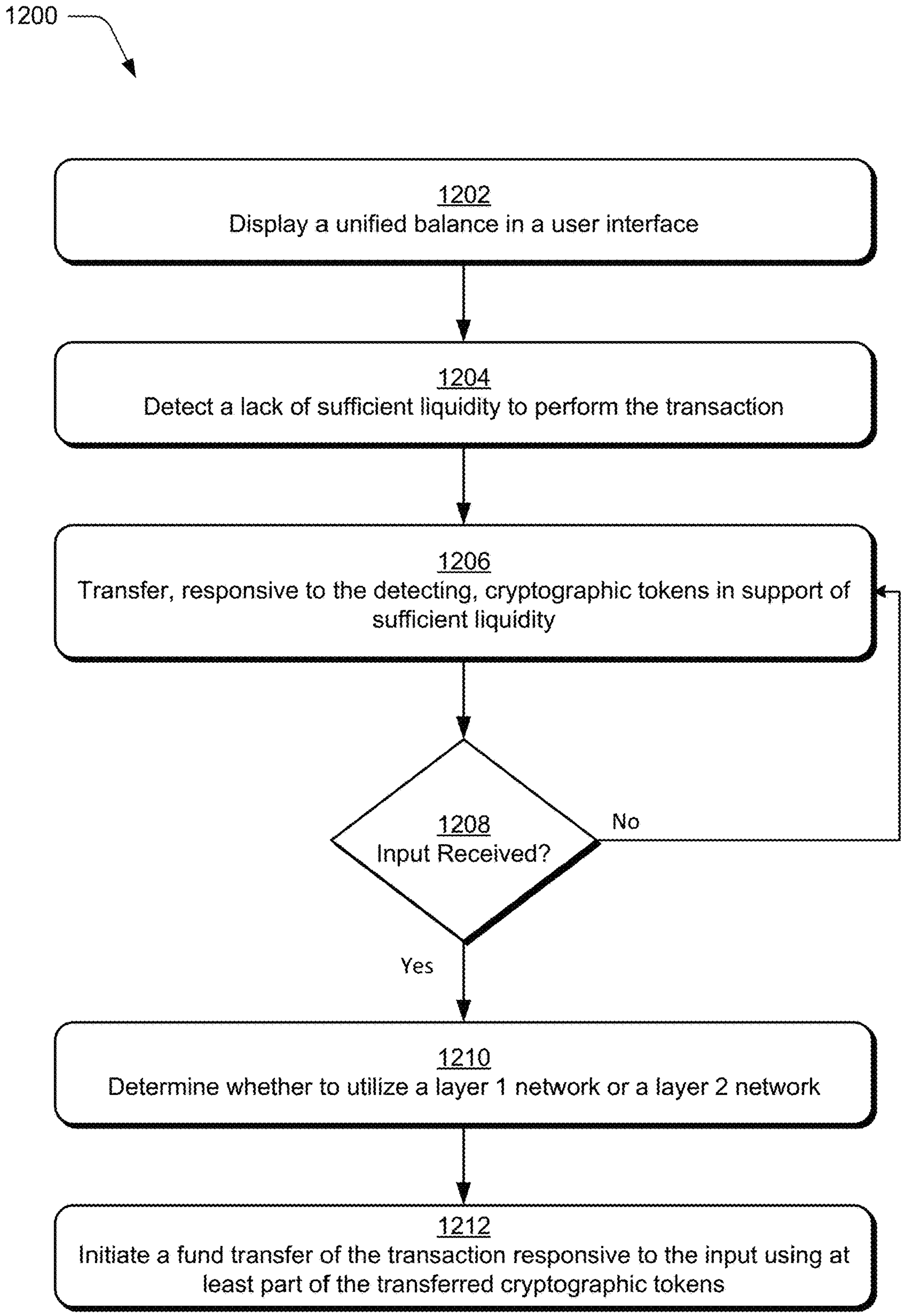
FIG. 12 is a non-limiting illustration of a flow diagram depicting a procedure in an example implementation of liquidity and security mechanisms implemented as part of a unified cryptographic wallet according to an implementation of the present subject matter.

FIG. 12 is a non-limiting illustration of a procedure 1200 in an example implementation of liquidity and security mechanisms implemented as part of a unified cryptographic wallet according to an implementation of the present subject matter.

A unified balance is displayed in a user interface (block 1202). As shown in FIG. 5, a unified balance 504 is displayed in a user interface 502. The unified balance 504 is used to represent a total amount cryptographic tokens maintained at a layer 1 network and a layer 2 network.

A lack of sufficient liquidity is detected to perform the transaction (block 1204). This detection, for instance, is based on a threshold amount defining a minimum balance to be maintained on the layer 2 network. Likewise, detection may also be based on a threshold amount defining a minimum balance to be maintained on the layer 1 network.

A transfer is performed, responsive to the detecting, of cryptographic tokens in support of sufficient liquidity between the decentralized network and the blockchain network (block 1206). Continuing with the previous example, the liquidity control module 612 transfers funds between the layer 1 network and the layer 2 network to comply with the minimum balances.

A determination is made as to whether an input is received (decision block 1208) to initiate a transaction. As shown in FIG. 8, a user interface 802 includes options to "send" or "request" funds as part of a transaction. If an input is not received ("no" from decision block 1208), the procedure returns and the first user interface 802 remains displayed.

If an input is received ("yes" from decision block 1208), a determination is made as to whether to perform the transaction via a layer 1 network or the layer 2 network (block 1206). Fees on a layer 2 network, for instance, may be set as a percentage of value, therefore the bigger the transfer, the higher the fee. As a result, there is a point at which a transfer of funds on a layer 1 network is cheaper to perform than on a layer 2 network. There are also tradeoffs between time and cost, e.g., cheaper and slower versus faster and expensive. An ability to select the network by the wallet application 402 and/or wallet server 404 is made possible due to liquidity that is made available on both networks through use of the unified wallet, which is not possible in conventional techniques.

Upon completion of the transfer above between the layer 1 network and the layer 2 network, a fund transfer is initiated between the layer 1 network and the layer 2 network using at least part of the transferred cryptographic tokens (block 1212). The transaction, for instance, is performable after the transfer performed above between the layer 1 and layer 2 networks such that sufficient funds are available to perform the transaction. The wallet application 402 in this example then signs the request for communication to a wallet server 404.

Figure 13:
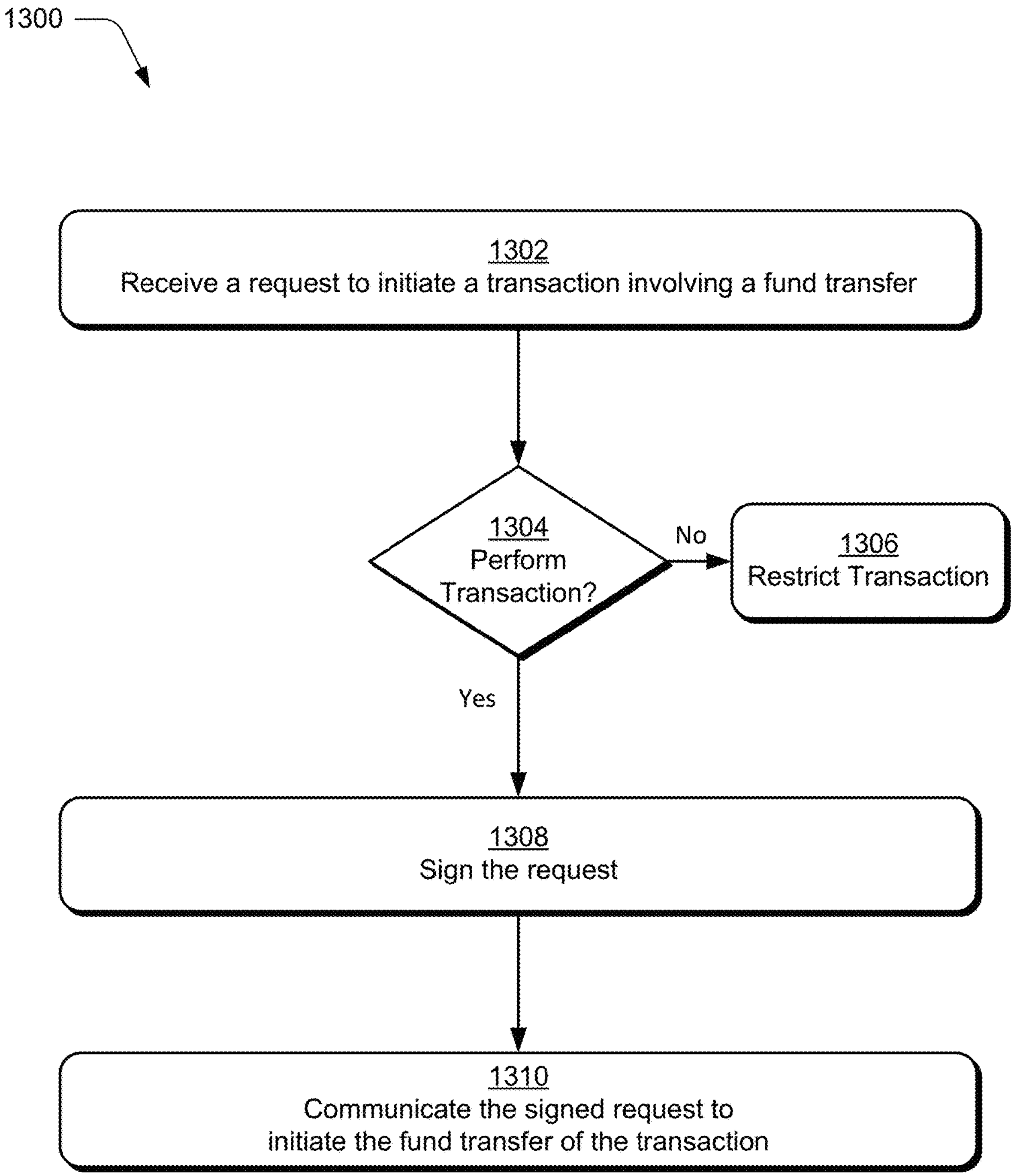
FIG. 13 is a non-limiting illustration of a flow diagram depicting a procedure in an example implementation of a multi-party computation (MPC) security mechanism implemented as part of a unified cryptographic wallet according to an implementation of the present subject matter.

FIG. 13 is a non-limiting illustration of a procedure 1300 in an example implementation of a multi-party computation (MPC) security mechanism implemented as part of a unified cryptographic wallet according to an implementation of the present subject matter. To begin in this example, a request is received to initiate a transaction involving a fund transfer using a first decentralized network or a second decentralized network (block 1302). The request, for instance, is initiated by a wallet application 402 and received at a wallet server 404 for performing a transaction using the blockchain network 102 or the decentralized network 104.

A determination is also made as whether to perform the transaction (decision block 1304). The wallet server 404, determines whether an amount of the transaction is below a transaction limit 422. If the amount of the transaction is below the limit, the transaction is permitted by be performed ("yes" from decision block 1304). If the amount of the transaction is above the limit, a request is made for an attestation from a wallet hardware key device. If the amount of above the limit and the attestation is not received ("no" from decision block 1304), the transaction is restricted (block 1306).

If the transaction is permitted to be performed ("yes" from decision block 1304), the request is signed (block 1308), e.g., using the wallet server key 410 by the wallet server 404, the wallet hardware key from the wallet hardware key device, and so on as part of a multi-party computation (MPC) security mechanism. The signed request is communicated to initiate the fund transfer of the transaction (block 1310) using the first or second decentralized network. The wallet server 404, for instance, communicates the signed request via a dedicated API of the transaction server 702 to perform the transaction on either the blockchain network 102 or the decentralized network 104. A variety of other examples are also contemplated.

Example System and Device

Figure 14:
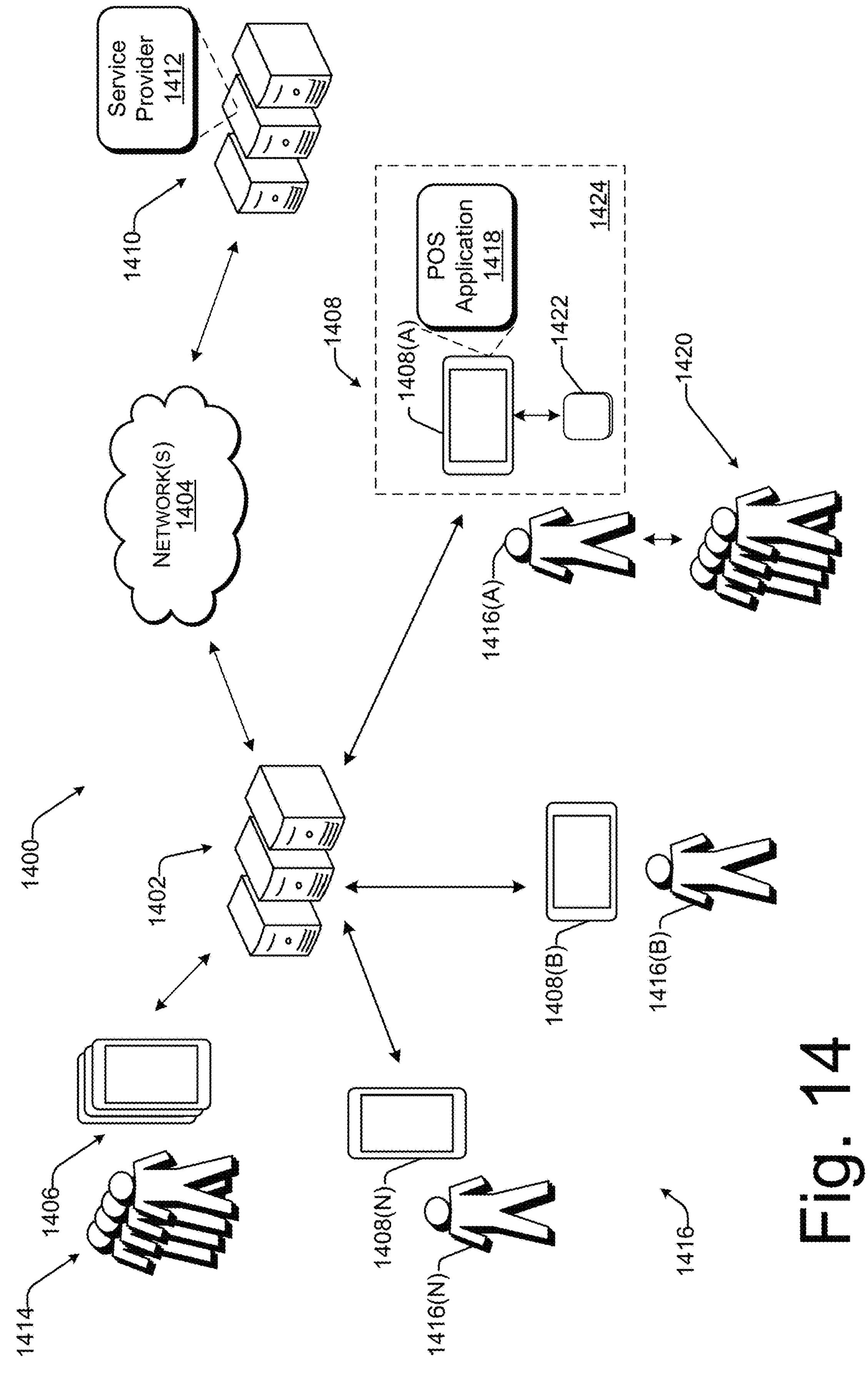
FIG. 14 is an example environment with which techniques described herein can be implemented, according to an implementation described herein.

FIG. 14 illustrates an example environment 1400. The environment 1400 includes server(s) 1402 that can communicate over a network 1404 with user devices 1406 (which, in some examples can be merchant devices 1408 (individually, 1408(A)-1408(N))) and/or server(s) 1410 associated with third-party service provider(s). The server(s) 1402 can be associated with a service provider 1412 that can provide one or more services for the benefit of users 1414, as described below. Actions attributed to the service provider 1412 can be performed by the server(s) 1402. The servers 1402, for instance, are configurable to implement the wallet server 404 and the transaction server 702.

The environment 1400 can include a plurality of user devices 1406, as described above, which are configurable to implement the first and second edge devices 106, 108. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1414. The users 1414 can be referred to as customers, buyers, merchants, sellers, borrowers, employees, employers, payors, payees, couriers and so on. The users 1414 can interact with the user devices 1406 via user interfaces presented via the user devices 1406. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1406 can have an instance or versioned instance of an application, which can be downloaded from an application store, for example, which can present the user interface(s) described herein. In at least one example, a user 1414 can interact with the user interface via touch input, spoken input, or any other type of input.

As described above, in at least one example, the users 1414 can include merchants 1416 (individually, 1416(A)-1416(N)). In an example, the merchants 1416 can operate respective merchant devices 1408, which can be user devices 1406 configured for use by merchants 1416. For the purpose of this discussion, a "merchant" can be any entity that offers items (e.g., goods or services) for purchase or other means of acquisition (e.g., rent, borrow, barter, etc.). The merchants 1416 can offer items for purchase or other means of acquisition via brick-and-mortar stores, mobile stores (e.g., pop-up shops, food trucks, etc.), online stores, combinations of the foregoing, and so forth. In some examples, at least some of the merchants 1416 can be associated with a same entity but can have different merchant locations and/or can have franchise/franchisee relationships. In additional or alternative examples, the merchants 1416 can be different merchants. That is, in at least one example, the merchant 1416(A) is a different merchant than the merchant 1416(B) and/or the merchant 1416(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1408 can have an instance of a POS application 1418 stored thereon. The POS application 1418 can configure the merchant device 1408 as a POS terminal, which enables the merchant 1416(A) to interact with one or more customers 1420. As described above, the users 1414 can include customers, such as the customers 1420 shown as interacting with the merchant 1416(A). For the purpose of this discussion, a "customer" can be any entity that acquires items from merchants. While only two customers 1420 are illustrated in FIG. 14, any number of customers 1420 can interact with the merchants 1416. Further, while FIG. 14 illustrates the customers 1420 interacting with the merchant 1416(A), the customers 1420 can interact with any of the merchants 1416.

In at least one example, interactions between the customers 1420 and the merchants 1416 that involve the exchange of funds (from the customers 1420) for items (from the merchants 1416) can be referred to as "transactions." In at least one example, the POS application 1418 can determine transaction data associated with the POS transactions. Transaction data can include payment information, which can be obtained from a reader device 1422 associated with the merchant device 1408(A), user authentication data, purchase amount information, point-of-purchase information (e.g., item(s) purchased, date of purchase, time of purchase, etc.), etc. The POS application 1418 can send transaction data to the server(s) 1402 such that the server(s) 1402 can track transactions of the customers 1420, merchants 1416, and/or any of the users 1414 over time. Furthermore, the POS application 1418 can present a UI to enable the merchant 1416(A) to interact with the POS application 1418 and/or the service provider via the POS application 1418.

In at least one example, the merchant device 1408(A) can be a special-purpose computing device configured as a POS terminal (via the execution of the POS application 1418). In at least one example, the POS terminal may be connected to a reader device 1422, which is capable of accepting a variety of payment instruments, such as credit cards, debit cards, gift cards, short-range communication based payment instruments, and the like, as described below. In at least one example, the reader device 1422 can plug in to a port in the merchant device 1408(A), such as a microphone port, a headphone port, an audio-jack, a data port, or other suitable port. In additional or alternative examples, the reader device 1422 can be coupled to the merchant device 1408(A) via another wired or wireless connection, such as via a Bluetooth®, BLE, and so on. Additional details are described below with reference to FIG. 16. In some examples, the reader device 1422 can read information from alternative payment instruments including, but not limited to, wristbands and the like.

In some examples, the reader device 1422 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1422, and communicate with the server(s) 1402, which can provide, among other services, a payment processing service. The server(s) 1402 associated with the service provider can communicate with server(s) 1410, as described below. In this manner, the POS terminal and reader device 1422 may collectively process transaction(s) between the merchants 1416 and customers 1420. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1422 of the POS system 1424 are shown as separate devices, in additional or alternative examples, the POS terminal and the reader device 1422 can be part of a single device. In some examples, the reader device 1422 can have a display integrated therein for presenting information to the customers 1420. In additional or alternative examples, the POS terminal can have a display integrated therein for presenting information to the customers 1420. POS systems, such as the POS system 1424, may be mobile, such that POS terminals and reader devices may process transactions in disparate locations across the world. POS systems can be used for processing card-present transactions and card-not-present (CNP) transactions, as described below.

A card-present transaction is a transaction where both a customer 1420 and his or her payment instrument are physically present at the time of the transaction. Card-present transactions may be processed by swipes, dips, taps, or any other interaction between a physical payment instrument (e.g., a card), or otherwise present payment instrument, and a reader device 1422 whereby the reader device 1422 is able to obtain payment data from the payment instrument. A swipe is a card-present transaction where a customer 1420 slides a card, or other payment instrument, having a magnetic strip through a reader device 1422 that captures payment data contained in the magnetic strip. A dip is a card-present transaction where a customer 1420 inserts a payment instrument having an embedded microchip (i.e., chip) into a reader device 1422 first. The dipped payment instrument remains in the payment reader until the reader device 1422 prompts the customer 1420 to remove the card, or other payment instrument. While the payment instrument is in the reader device 1422, the microchip can create a one-time code which is sent from the POS system 1424 to the server(s) 1410 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1420 may tap or hover his or her payment instrument (e.g., card, electronic device such as a smart phone running a payment application, etc.) over a reader device 1422 to complete a transaction via short-range communication (e.g., NFC, RFID, Bluetooth®, BLE, etc.). Short-range communication enables the payment instrument to exchange information with the reader device 1422. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1424, the server(s) 1402, and/or the server(s) 1410 may exchange payment information and transaction data to determine whether transactions are authorized. For example, the POS system 1424 may provide encrypted payment data, user authentication data, purchase amount information, point-of-purchase information, etc. (collectively, transaction data) to server(s) 1402 over the network(s) 1404. The server(s) 1402 may send the transaction data to the server(s) 1410. As described above, in at least one example, the server(s) 1410 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1410 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1410 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1410 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1410 associated therewith), and a payment authorization message is communicated from the issuer to the POS device via a path opposite of that described above, or via an alternate path.

As described above, the server(s) 1410, which can be associated with payment service provider(s), may determine whether the transaction is authorized based on the transaction data, as well as information relating to parties to the transaction (e.g., the customer 1420 and/or the merchant 1416(A)). The server(s) 1410 may send an authorization notification over the network(s) 1404 to the server(s) 1402, which may send the authorization notification to the POS system 1424 over the network(s) 1404 to indicate whether the transaction is authorized. The server(s) 1402 may also transmit additional information such as transaction identifiers to the POS system 1424. In one example, the server(s) 1402 may include a merchant application and/or other functional components for communicating with the POS system 1424 and/or the server(s) 1410 to authorize or decline transactions.

Based on the authentication notification that is received by the POS system 1424 from server(s) 1402, the merchant 1416(A) may indicate to the customer 1420 whether the transaction has been approved. In some examples, approval may be indicated at the POS system 1424, for example, at a display of the POS system 1424. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1414 can access all of the services of the service provider. In other examples, the users 1414 can have gradated access to the services, which can be based on risk tolerance, IDV outputs, subscriptions, and so on. In at least one example, access to such services can be availed to the merchants 1416 via the POS application 1418. In additional or alternative examples, each service can be associated with its own access point (e.g., application, web browser, etc.).

The service provider can offer payment processing services for processing payments on behalf of the merchants 1416, as described above. For example, the service provider can provision payment processing software, payment processing hardware and/or payment processing services to merchants 1416, as described above, to enable the merchants 1416 to receive payments from the customers 1420 when conducting POS transactions with the customers 1420. For instance, the service provider can enable the merchants 1416 to receive cash payments, payment card payments, and/or electronic payments from customers 1420 for POS transactions and the service provider can process transactions on behalf of the merchants 1416.

As the service provider processes transactions on behalf of the merchants 1416, the service provider can maintain accounts or balances for the merchants 1416 in one or more ledgers. For example, the service provider can analyze transaction data received for a transaction to determine an amount of funds owed to a merchant 1416(A) for the transaction. In at least one example, such an amount can be a total purchase price less fees charged by the service provider for providing the payment processing services. Based on determining the amount of funds owed to the merchant 1416(A), the service provider can deposit funds into an account of the merchant 1416(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1416(A) to a bank account of the merchant 1416(A) that is held at a bank or other financial institution (e.g., associated with the server(s) 1410). Scheduled deposits can occur at a prearranged time after a POS transaction is funded, which can be a business day after the POS transaction occurred, or sooner or later. In some examples, the merchant 1416(A) can access funds prior to a scheduled deposit. For instance, the merchant 1416(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1416(A) can have a payment instrument that is linked to the stored balance that enables the merchant to access the funds without first transferring the funds from the account managed by the service provider to the bank account of the merchant 1416(A).

In at least one example, the service provider may provide inventory management services. That is, the service provider may provide inventory tracking and reporting. Inventory management services may enable the merchant 1416(A) to access and manage a database storing data associated with a quantity of each item that the merchant 1416(A) has available (i.e., an inventory). Furthermore, in at least one example, the service provider can provide catalog management services to enable the merchant 1416(A) to maintain a catalog, which can be a database storing data associated with items that the merchant 1416(A) has available for acquisition (i.e., catalog management services). In at least one example, the catalog may include a plurality of data items and a data item of the plurality of data items may represent an item that the merchant 1416(A) has available for acquisition. The service provider can offer recommendations related to pricing of the items, placement of items on the catalog, and multi-party fulfillment of the inventory.

In at least one example, the service provider can provide business banking services, which allow the merchant 1416(A) to track deposits (from payment processing and/or other sources of funds) into an account of the merchant 1416(A), payroll payments from the account (e.g., payments to employees of the merchant 1416(A)), payments to other merchants (e.g., business-to-business) directly from the account or from a linked debit card, withdrawals made via scheduled deposit and/or instant deposit, etc. Furthermore, the business banking services can enable the merchant 1416(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1416 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1416. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1412 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1414 who are unfamiliar with HTML, XML, JavaScript®, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1416. In at least one example, the service provider can recommend and/or generate content items to supplement omni-channel presences of the merchants 1416. That is, if a merchant of the merchants 1416 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1414 to set schedules for scheduling appointments and/or users 1414 to schedule appointments.

In some examples, the service provider can provide restaurant management services to enable users 1414 to make and/or manage reservations, to monitor front-of-house and/or back-of-house operations, and so on. In such examples, the merchant device(s) 1408 and/or server(s) 1402 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1414 who can travel between locations to perform services for a requesting user 1414 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1406.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1414, voice inputs into a virtual assistant or the like, to determine intents of user(s) 1414. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1414 may be new to the service provider such that the user 1414 that has not registered (e.g., subscribed to receive access to one or more services offered by the service provider) with the service provider. The service provider can offer onboarding services for registering a potential user 1414 with the service provider. In some examples, onboarding can involve presenting various questions, prompts, and the like to a potential user 1414 to obtain information that can be used to generate a profile for the potential user 1414. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1414 providing all necessary information, the potential user 1414 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1410). That is, the service provider can offer IDV services to verify the identity of users 1414 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1414 accurately identifies the customer (or potential customer), i.e., "Is the customer who they say they are?"

The service provider is capable of providing additional or alternative services and the services described above are offered as a sampling of services. In at least one example, the service provider can exchange data with the server(s) 1410 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1402) and/or the server(s) 1410 via the network(s) 1404. In some examples, the merchant device(s) 1408 are not capable of connecting with the service provider (e.g., the server(s) 1402) and/or the server(s) 1410, due to a network connectivity issue, for example. In additional or alternative examples, the server(s) 1402 are not capable of communicating with the server(s) 1410 due to network connectivity issue, for example. In such examples, devices may operate in "offline" mode where at least some payment data is stored (e.g., on the merchant device(s) 1408) and/or the server(s) 1402 until connectivity is restored and the payment data can be transmitted to the server(s) 1402 and/or the server(s) 1410 for processing.

In at least one example, the service provider can be associated with a hub, such as an order hub, an inventory hub, a fulfillment hub and so on, which can enable integration with one or more additional service providers (e.g., associated with the additional server(s) 1410). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1406 that are in communication with server(s) 1402 of the service provider. That is, techniques described herein are directed to a specific implementation—or, a practical application—of utilizing a distributed system of user devices 1406 that are in communication with server(s) 1402 of the service provider to perform a variety of services, as described above. The unconventional configuration of the distributed system described herein enables the server(s) 1402 that are remotely-located from end-users (e.g., users 1414) to intelligently offer services based on aggregated data associated with the end-users, such as the users 1414 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1414 and user devices 1406. Furthermore, such features are changed dynamically based on the profiles of the users involved interacting with the GUIs. As such, techniques described herein are directed to improvements to computing systems.

Figure 15:
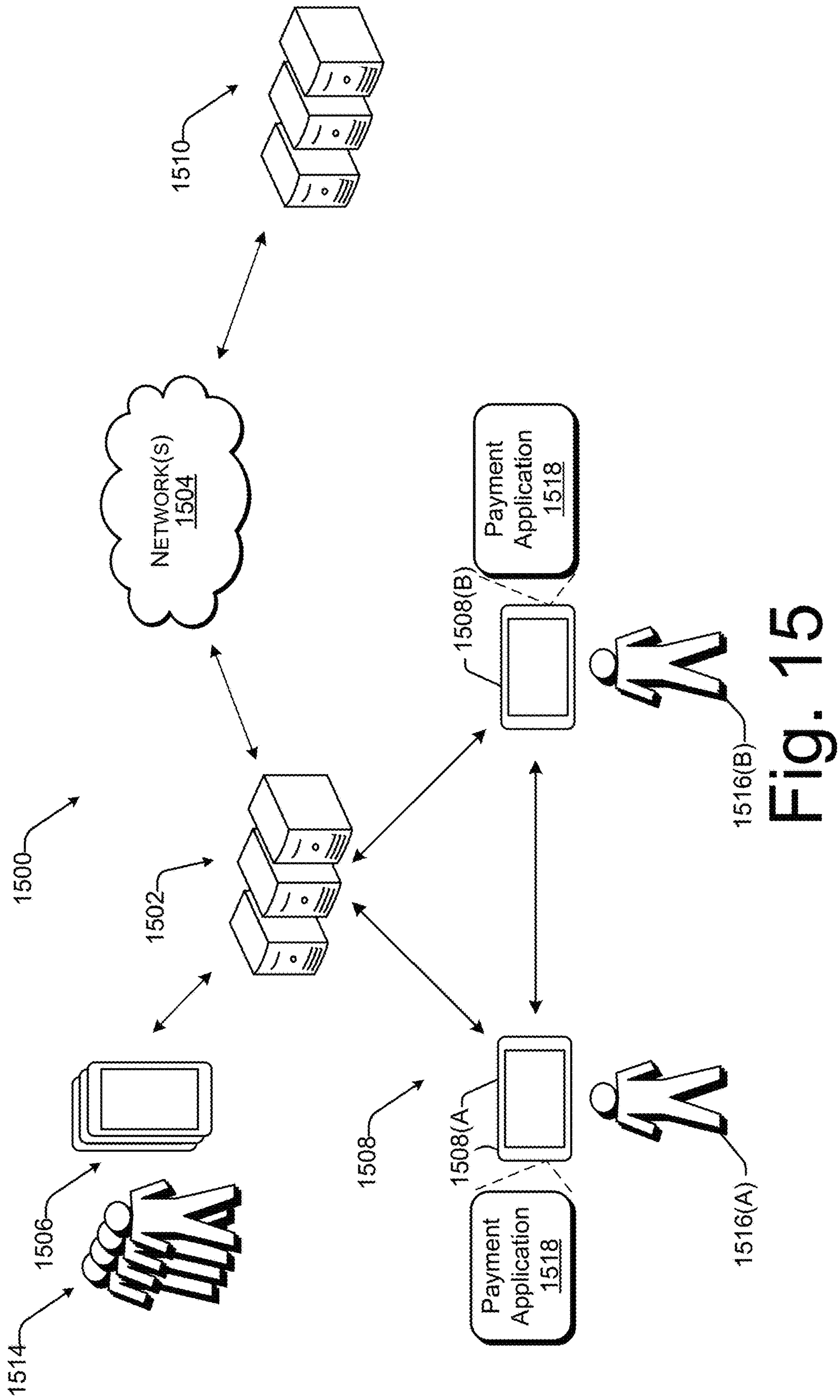
FIG. 15 is an example environment with which techniques described herein can be implemented, according to an implementation described herein.

FIG. 15 illustrates an example environment 1500. The environment 1500 includes server(s) 1502 that can communicate over a network 1504 with user devices 1506 (which, in some examples can be user devices 1508 (individually, 1508(A), 1508(B)) and/or server(s) 1510 associated with third-party service provider(s). The server(s) 1502 can be associated with a service provider that can provide one or more services for the benefit of users 1514, as described below. Actions attributed to the service provider can be performed by the server(s) 1502. In some examples, the service provider 1412 referenced in FIG. 14 can be the same or different than the service provider referenced in FIG. 15. The servers 1502, for instance, are configurable to implement the wallet server 404 and the transaction server 702. Users 1514 correspond to the first entity 112 and the second entity 114.

The environment 1500 can include a plurality of user devices 1506, as described above. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1514. The users 1514 can be referred to as customers, buyers, merchants, sellers, borrowers, employees, employers, payors, payees, couriers and so on. The users 1514 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1506 can have an instance or versioned instance of an application, which can be downloaded from an application store, for example, which can present the user interface(s) described herein. In at least one example, a user 1514 can interact with the user interface via touch input, spoken input, or any other type of input.

In at least one example, the service provider can provide a peer-to-peer payment service that enables peer-to-peer payments between two or more users 1514. Two users, user 1516(A) and user 1516(B) are illustrated in FIG. 15 as "peers" in a peer-to-peer payment. In at least one example, the service provider can communicate with instances of a payment application 1518 (or other access point) installed on devices 1506 configured for operation by users 1514. In an example, an instance of the payment application 1518 executing on a first device 1508(A) operated by a payor (e.g., user 1516(A)) can send a request to the service provider to transfer an asset (e.g., fiat currency, non-fiat currency, digital assets, cryptocurrency, securities, gift cards, and/or related assets) from the payor to a payee (e.g., user 1516(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 16:
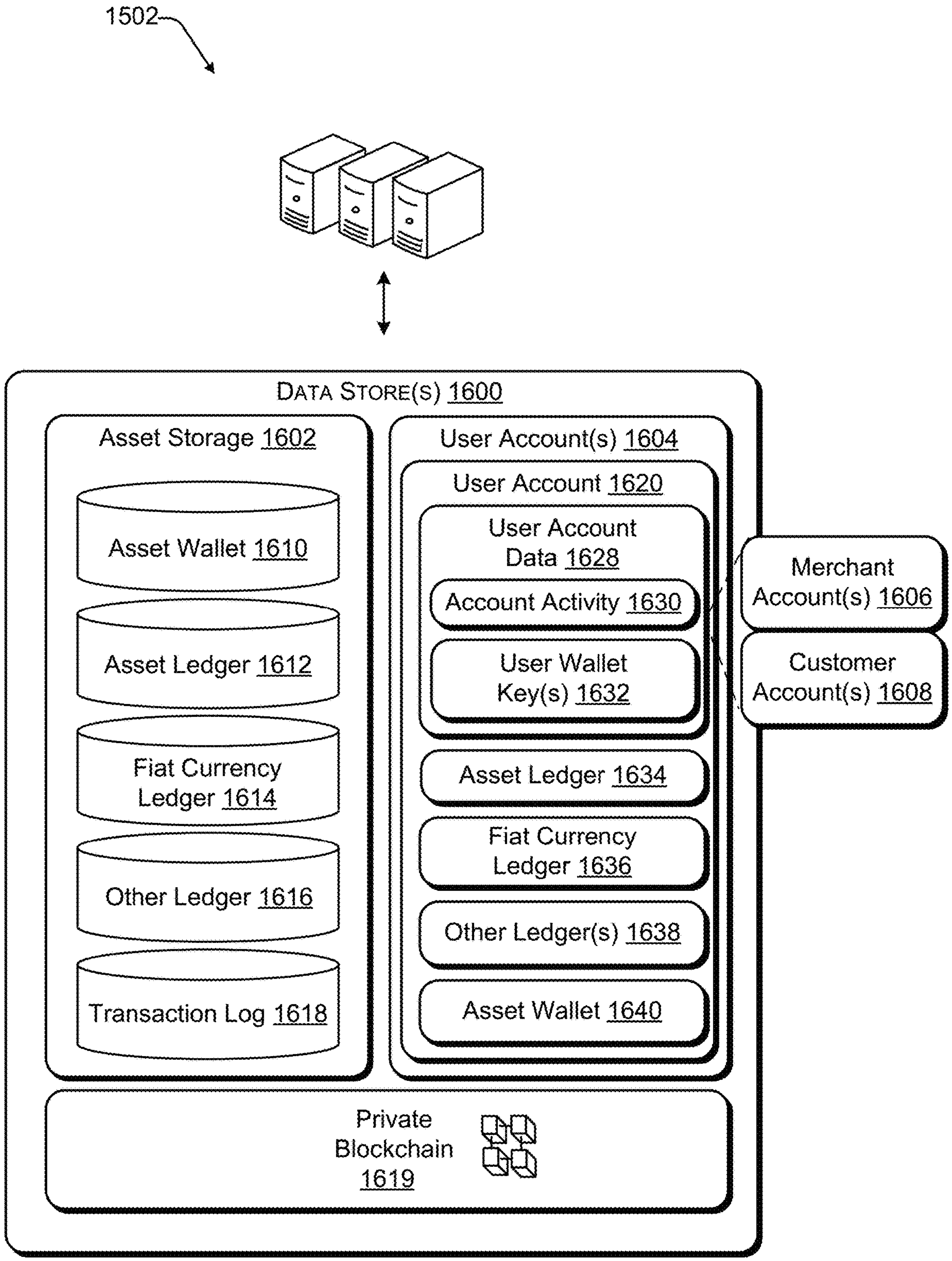
FIG. 16 is an environment associated with a ledger system with which techniques described herein can be implemented, according to an implementation described herein.

In some examples, the service provider can utilize a ledger system to track transfers of assets between users 1514. FIG. 16, below, provides additional details associated with such a ledger system. The ledger system can enable users 1514 to own fractional shares of assets that are not otherwise available. For instance, a user can own a fraction of a Bitcoin or a stock. Additional details are described herein.

In at least one example, the service provider can facilitate transfers and can send notifications related thereto to instances of the payment application 1518 executing on user device(s) of payee(s). As an example, the service provider can transfer assets from an account of user 1516(A) to an account of the user 1516(B) and can send a notification to the user device 1508(B) of the user 1516(B) for presentation via a user interface. The notification can indicate that a transfer is in process, a transfer is complete, or the like. In some examples, the service provider can send additional or alternative information to the instances of the payment application 1518 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1502 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1518 executing on the user devices 1506. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 15 or a third-party service provider associated with the server(s) 1510. In examples where the content provider is a third-party service provider, the server(s) 1510 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 15. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1506 (e.g., mobile device or conventional personal computer (PC)) based on instructions transmitted to and from the server(s) 1502 (which, in such an example can be called a "messaging server"). In some instances, the messaging application can include a payment application with messaging capability that enables users of the payment application to communicate with one another. In such instances, the payment application can be executed on a user device 1506 based on instructions transmitted to and from the server(s) 1502 (e.g., the payment service discussed in this description or another payment service that supports payment transactions). In some examples, the messaging application can be provided by a third-party service provider associated with the server(s) 1510. In examples where the messaging application is a third-party service provider, the server(s) 1510 can be accessible via one or more APIs or other integrations.

As described above, the service provider can facilitate peer-to-peer transactions, which can enable users 1514 to transfer fiat currency, non-fiat currency, cryptocurrency, securities, or other assets, or portions thereof, to other users 1514. In at least one example, individual users can be associated with user accounts. Additional details associated with user accounts and the transfer of assets between users 1514 are described below with reference to FIG. 16.

Furthermore, the service provider of FIG. 15 can enable users 1514 to perform banking transactions via instances of the payment application 1518. For example, users can configure direct deposits or other deposits for adding assets to their various ledgers/balances. Further, users 1514 can configure bill pay, recurring payments, and/or the like using assets associated with their accounts. In addition to sending and/or receiving assets via peer-to-peer transactions, users 1514 buy and/or sell assets via asset networks such as cryptocurrency networks, securities networks, and/or the like.

FIG. 16 illustrates example data store(s) 1600 that can be associated with the server(s) 1502.

In at least one example, the data store(s) 1600 can store assets in an asset storage 1602, as well as data in user account(s) 1604. In some examples, user account(s) 1604 can include merchant account(s) 1606, and/or customer account(s) 1608. In at least one example, the asset storage 1602 can be used to store assets managed by the service provider of FIG. 15. In at least one example, the asset storage 1602 can be used to record whether individual of the assets are registered to users. For example, the asset storage 1602 can include an asset wallet 1610 for storing records of assets owned by the service provider of FIG. 15, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1510 can be associated therewith. In some examples, the asset wallet 1610 can communicate with the asset network via one or more components associated with the server(s) 1502.

The asset wallet 1610 can be associated with one or more addresses and can vary addresses used to acquire assets (e.g., from the asset network(s)) so that its holdings are represented under a variety of addresses on the asset network. In examples where the service provider of FIG. 15 has its own holdings of cryptocurrency (e.g., in the asset wallet 1610), a user can acquire cryptocurrency directly from the service provider of FIG. 15. In some examples, the service provider of FIG. 15 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1602 may contain ledgers that store records of assignments of assets to users 1514. Specifically, the asset storage 1602 may include asset ledger 1612, fiat currency ledger 1614, and other ledger(s) 1616, which can be used to record transfers of assets between users 1514 of the service provider and/or one or more third-parties (e.g., merchant network(s), payment card network(s), ACH network(s), equities network(s), the asset network, securities networks, etc.). In doing so, the asset storage 1602 can maintain a running balance of assets managed by the service provider of FIG. 15. The ledger(s) of the asset storage 1602 can further indicate some of the running balance for each of the ledger(s) stored in the asset storage 1602 is assigned or registered to one or more user account(s) 1604.

In at least one example, the asset storage 1602 can include transaction logs 1618, which can include records of past transactions involving the service provider of FIG. 15. In at least one example, transaction data, as described herein, can be stored in association with the transaction logs 1618.

In some examples, the data store(s) 1600 can store a private blockchain 1619. A private blockchain 1619 can function to record sender addresses, recipient addresses, public keys, values of cryptocurrency transferred, and/or can be used to verify ownership of cryptocurrency tokens to be transferred. In some examples, the service provider of FIG. 15 can record transactions taking place within the service provider of FIG. 15 involving cryptocurrency until the number of transactions has exceeded a determined limit (e.g., number of transactions, storage space allocation, etc.). Based at least in part on determining that the limit has been reached, the service provider of FIG. 15 can publish the transactions in the private blockchain 1619 to a public blockchain (e.g., associated with the asset network), where miners can verify the transactions and record the transactions to blocks on the public blockchain. In at least one example, the service provider of FIG. 15 can participate as miner(s) at least for its transactions to be posted to the public blockchain.

In at least one example, the data store(s) 1600 can store and/or manage accounts, such as user account(s) 1604, merchant account(s) 1606, and/or customer account(s) 1608. In at least one example, the user account(s) 1604 may store records of user accounts associated with the users 1514. In at least one example, the user account(s) 1604 can include a user account 1620, which can be associated with a user (of the users 1514). Other user accounts of the user account(s) 1604 can be similarly structured to the user account 1620, according to some examples. In other examples, other user accounts may include more or less data and/or account information than that provided by the user account 1620. In at least one example, the user account 1620 can include user account data 1628, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1628 can include account activity 1630 and user wallet key(s) 1632. The account activity 1630 may include a transaction log for recording transactions associated with the user account 1620. In some examples, the user wallet key(s) 1632 can include a public-private key-pair and a respective address associated with the asset network or other asset networks. In some examples, the user wallet key(s) 1632 may include one or more key pairs, which can be unique to the asset network or other asset networks.

In addition to the user account data 1628, the user account 1620 can include ledger(s) for account(s) managed by the service provider of FIG. 15, for the user. For example, the user account 1620 may include an asset ledger 1634, a fiat currency ledger 1636, and/or one or more other ledgers 1638. The ledger(s) can indicate that a corresponding user utilizes the service provider of FIG. 15 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 15.

In some examples, the asset ledger 1634 can store a balance for each of one or more cryptocurrencies (e.g., Bitcoin, Ethereum, Litecoin, etc.) registered to the user account 1620. In at least one example, the asset ledger 1634 can further record transactions of cryptocurrency assets associated with the user account 1620. For example, the user account 1620 can receive cryptocurrency from the asset network using the user wallet key(s) 1632. In some examples, the user wallet key(s) 1632 may be generated for the user upon request. User wallet key(s) 1632 can be requested by the user in order to send, exchange, or otherwise control the balance of cryptocurrency held by the service provider of FIG. 15 (e.g., in the asset wallet 1640) and registered to the user. In some examples, the user wallet key(s) 1632 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 15 and the value is credited as a balance in asset ledger 1634), by purchasing currency in the form associated with the account using currency in a different form (e.g., buying a value of cryptocurrency from the service provider of FIG. 15 using a value of fiat currency reflected in fiat currency ledger 1616, and crediting the value of cryptocurrency in asset ledger 1614), or by conducting a transaction with another user (customer or merchant) of the service provider of FIG. 15 wherein the account receives incoming currency (which can be in the form associated with the account or a different form, in which the incoming currency may be converted to the form associated with the account). In some examples, the user account data 1628 can include preferences for maintaining balances of individual of the ledgers. For example, the service provider of FIG. 15 can automatically debit the fiat currency ledger 1616 to increase the asset ledger 1614, or another account associated with the user whenever the cryptocurrency balance (e.g., of the asset ledger 1614) falls below a stated level (e.g., a threshold). Conversely, in some embodiments, the service provider of FIG. 15 can automatically credit the fiat currency ledger 1616 to decrease the asset ledger 1614 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 15 (i.e., an external account). In at least one example, the user can transfer all or a portion of a balance of the cryptocurrency stored in the third-party cryptocurrency wallet to the service provider of FIG. 15. Such a transaction can require the user to transfer an amount of the cryptocurrency in a message signed by user's private key to an address provided by the service provider of FIG. 15. In at least one example, the transaction can be sent to miners to bundle the transaction into a block of transactions and to verify the authenticity of the transactions in the block. Once a miner has verified the block, the block is written to a public, distributed blockchain where the service provider of FIG. 15 can then verify that the transaction has been confirmed and can credit the user's asset ledger 1614 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 15. As described above, in some examples, the service provider of FIG. 15 can acquire cryptocurrency from a third-party source. In such examples, the asset wallet 1610 can be associated with different addresses and can vary addresses used to acquire cryptocurrency so that its holdings are represented under a variety of addresses on a blockchain. When the service provider of FIG. 15 has their own holdings of cryptocurrency, users can acquire cryptocurrency directly from the service provider of FIG. 15. In some examples, the service provider of FIG. 15 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 15 has its own cryptocurrency assets, cryptocurrency transferred in a transaction (e.g., data with address provided for receipt of transaction and a balance of cryptocurrency transferred in the transaction) can be stored in the asset wallet 1610. In at least one example, the service provider of FIG. 15 can credit the asset ledger 1612 of the user. Additionally, while the service provider of FIG. 15 recognizes that the user retains the value of the transferred cryptocurrency through crediting the asset ledger 1612, any person that inspects the blockchain will see the cryptocurrency as having been transferred to the service provider of FIG. 15. In some examples, the asset wallet 1610 can be associated with many different addresses. In such examples, any person that inspects the blockchain may not easily associate all cryptocurrency stored in asset wallet 1610 as belonging to the same entity. It is this presence of a private ledger that is used for real-time transactions and maintained by the service provider of FIG. 15, combined with updates to the public ledger at other times, that allows for extremely fast transactions using cryptocurrency to be achieved. In some examples, the "private ledger" can refer to the asset ledger 1612, which in some examples, can utilize the private blockchain 1619, as described herein. The "public ledger" can correspond to a public blockchain associated with the asset network.

In at least one example, a user's asset ledger 1614, fiat currency ledger 1616, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1614. In some examples, a user can receive fiat currency or another currency in the form of payment for a transaction with another user. In at least one example, at least a portion of such funds can be converted into cryptocurrency by the service provider of FIG. 15 and used to fund the asset ledger 1614 of the user.

As addressed above, in some examples, users can also have other accounts maintained by the service provider of FIG. 15. For example, a user can also have an account in U.S. dollars, which can be tracked, for example, via the fiat currency ledger 1616. Such an account can be funded by transferring money from a bank account at a third-party bank to an account maintained by the service provider of FIG. 15 as is conventionally known. In some examples, a user can receive fiat currency in the form of payment for a transaction with another user. In such examples, at least a portion of such funds can be used to fund the fiat currency ledger 1616.

In some examples, a user can have one or more internal payment cards registered with the service provider of FIG. 15. Internal payment cards can be linked to one or more of the accounts associated with the user account 1620. In some embodiments, options with respect to internal payment cards can be adjusted and managed using an application (e.g., the payment application 1518).

In at least one example, as described above, each ledger can correspond to an account of the user that is managed by the service provider of FIG. 15. In at least one example, individual of the accounts can be associated with a wallet or a stored balance for use in payment transactions, peer-to-peer transactions, payroll payments, etc.

In at least one example, the user account 1620 can be associated with an asset wallet 1640. The asset wallet 1640 of the user can be associated with account information that can be stored in the user account data 1628 and, in some examples, can be associated with the user wallet key(s) 1632. In at least one example, the asset wallet 1640 can store data indicating an address provided for receipt of a cryptocurrency transaction. In at least one example, the balance of the asset wallet 1640 can be based at least in part on a balance of the asset ledger 1614. In at least one example, funds availed via the asset wallet 1640 can be stored in the asset wallet 1640 or the asset wallet 1610. Funds availed via the asset wallet 1610 can be tracked via the asset ledger 1614. The asset wallet 1640, however, can be associated with additional cryptocurrency funds.

In at least one example, when the service provider of FIG. 15 includes a private blockchain 1619 for recording and validating cryptocurrency transactions, the asset wallet 1640 can be used instead of, or in addition to, the asset ledger 1614. For example, at least one example, a merchant can provide the address of the asset wallet 1640 for receiving payments. In an example where a customer is paying in cryptocurrency and the customer has their own cryptocurrency wallet account associated with the service provider of FIG. 15, the customer can send a message signed by its private key including its wallet address (i.e., of the customer) and identifying the cryptocurrency and value to be transferred to the merchant's asset wallet 1640. The service provider of FIG. 15 can complete the transaction by reducing the cryptocurrency balance in the customer's cryptocurrency wallet and increasing the cryptocurrency balance in the merchant's asset wallet 1640. In addition to recording the transaction in the respective cryptocurrency wallets, the transaction can be recorded in the private blockchain 1619 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can involve transfer by a user of an amount of cryptocurrency in a message signed by the user's private key to an address of the cryptocurrency wallet account. The transferred amount of cryptocurrency can then be within the cryptocurrency wallet account for use in later transactions.

While the asset ledger 1614 and/or asset wallet 1640 are each described above with reference to cryptocurrency, the asset ledger 1614 and/or asset wallet 1640 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 15 is an aspect of the technology disclosed that enables technical advantages of increased processing speed and improved security.

Figure 17:
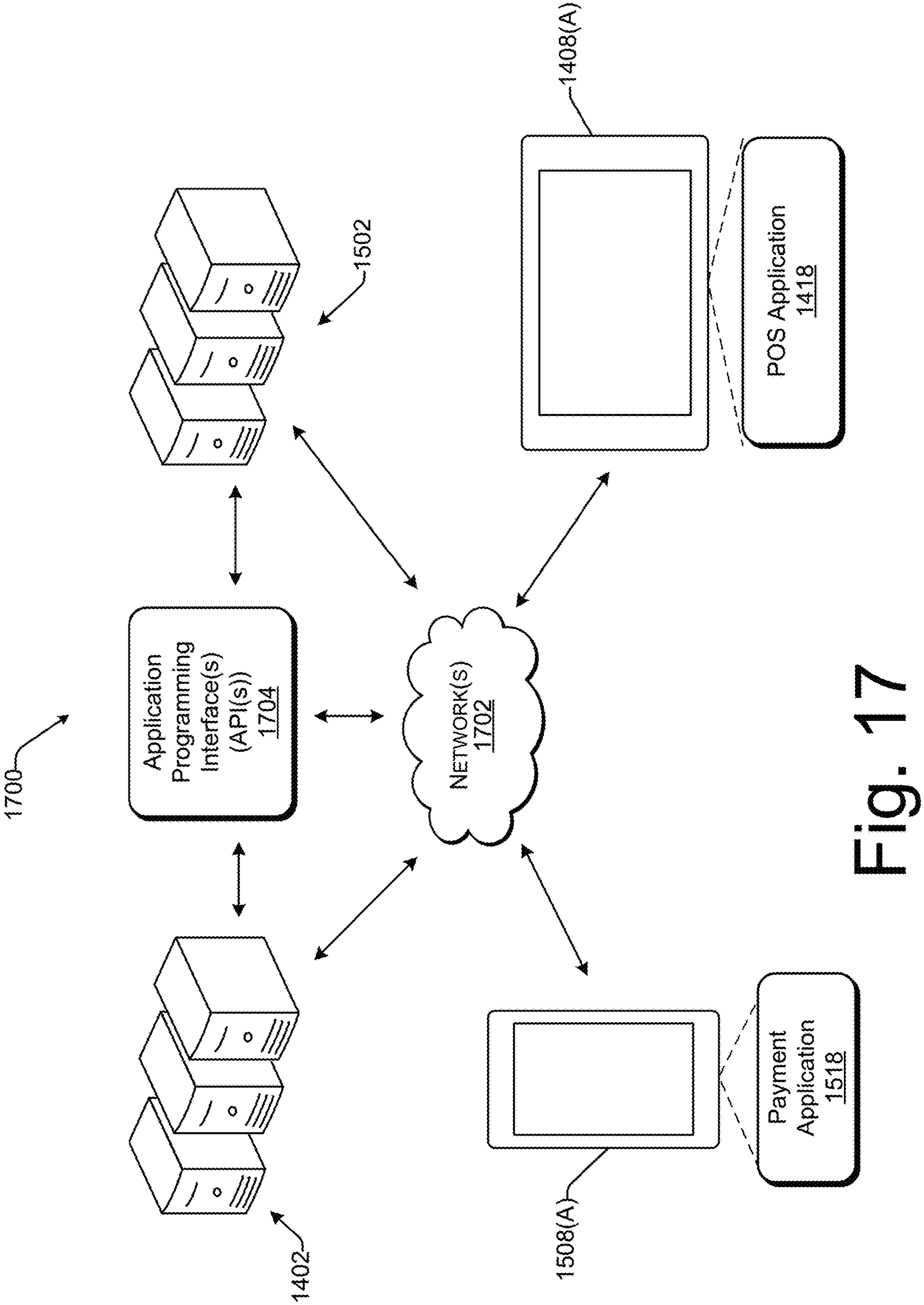
FIG. 17 is an example environment in which the environments of FIGS. 14 and 15 can be integrated to enable payments at the point-of-sale using assets associated with user accounts in the peer-to-peer environment of FIG. 16 with which techniques described herein can be implemented, according to an implementation described herein.

FIG. 17 illustrates an example environment 1700 wherein the environment 1400 and the environment 1500 can be integrated to enable payments at the point-of-sale using assets associated with user accounts in the peer-to-peer environment of FIG. 15. As illustrated, each of the components can communicate with one another via one or more networks 1702. In some examples, one or more APIs 1704 or other functional components can be used to facilitate such communication.

In at least one example, the example environment can enable contactless payments, via integration of peer-to-peer payment, or other payment making, platform(s) and payment processing platform(s), are described herein. For the purpose of FIG. 16, the environment 1400 can refer to a payment processing platform and the environment 1500 can refer to a peer-to-peer payment, or payment making, platform. In an example, such an integration can enable a customer to participate in a transaction via their own computing device instead of interacting with a merchant device of a merchant, such as the merchant device 1408(A). In such an example, the POS application 1418, associated with a payment processing platform and executable by the merchant device 1408(A) of the merchant, can present a Quick Response (QR) code, or other code that can be used to identify a transaction (e.g., a transaction code), in association with a transaction between the customer and the merchant. The QR code, or other transaction code, can be provided to the POS application 1418 via an API associated with the peer-to-peer payment platform. In an example, the customer can utilize their own computing device, such as the user device 1508(A), to capture the QR code, or the other transaction code, and to provide an indication of the captured QR code, or other transaction code, to server(s) 1402 and/or server(s) 1502.

Based at least in part on the integration of the peer-to-peer payment platform and the payment processing platform (e.g., via the API), the server(s) 1402 and/or 1502 associated with each can exchange communications with each other- and with a payment application 1518 associated with the peer-to-peer payment platform and/or the POS application 1418—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1508(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1508(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1418 and the payment application 1518, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1508(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1418, associated with a payment processing platform, on the merchant device 1408(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1408(A) can present a QR code, or other transaction code, that can be associated with a peer-to-peer payment platform. The customer can use a camera associated with the user device 1508(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1418, associated with a payment processing platform, on the merchant device 1408(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1418 can cause a text message with a resource locator (e.g., uniform resource locator (URL)) that can be associated with a peer-to-peer payment platform to be sent to the user device 1508(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1508 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1418 of a merchant device 1408(A) at a brick-and-mortar store of a merchant to a payment application 1518 of a user device 1508(A) of a customer to enable the customer to participate in a transaction via their own computing device. For instance, in a "scan to pay" example as described above, based at least in part on capturing the QR code, or other transaction code, via the user device 1508(A), the payment processing platform can provide transaction data to the peer-to-peer payment platform for presentation via the payment application 1518 on the user device 1508(A). In some examples, the customer can watch items being added to their cart (e.g., via a user interface presented via the payment application). As an item is added to a virtual cart by the merchant—via the POS application 1418 on the merchant device 1408(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1518 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1508(A) during or after payment of the transaction.

In some examples, based at least in part on capturing the QR code, or other transaction code, the payment processing platform can provide transaction data to the peer-to-peer payment platform for presentation via the payment application 1518 on the computing device of the customer, such as the user device 1508(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1518 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1418, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1518 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 18:
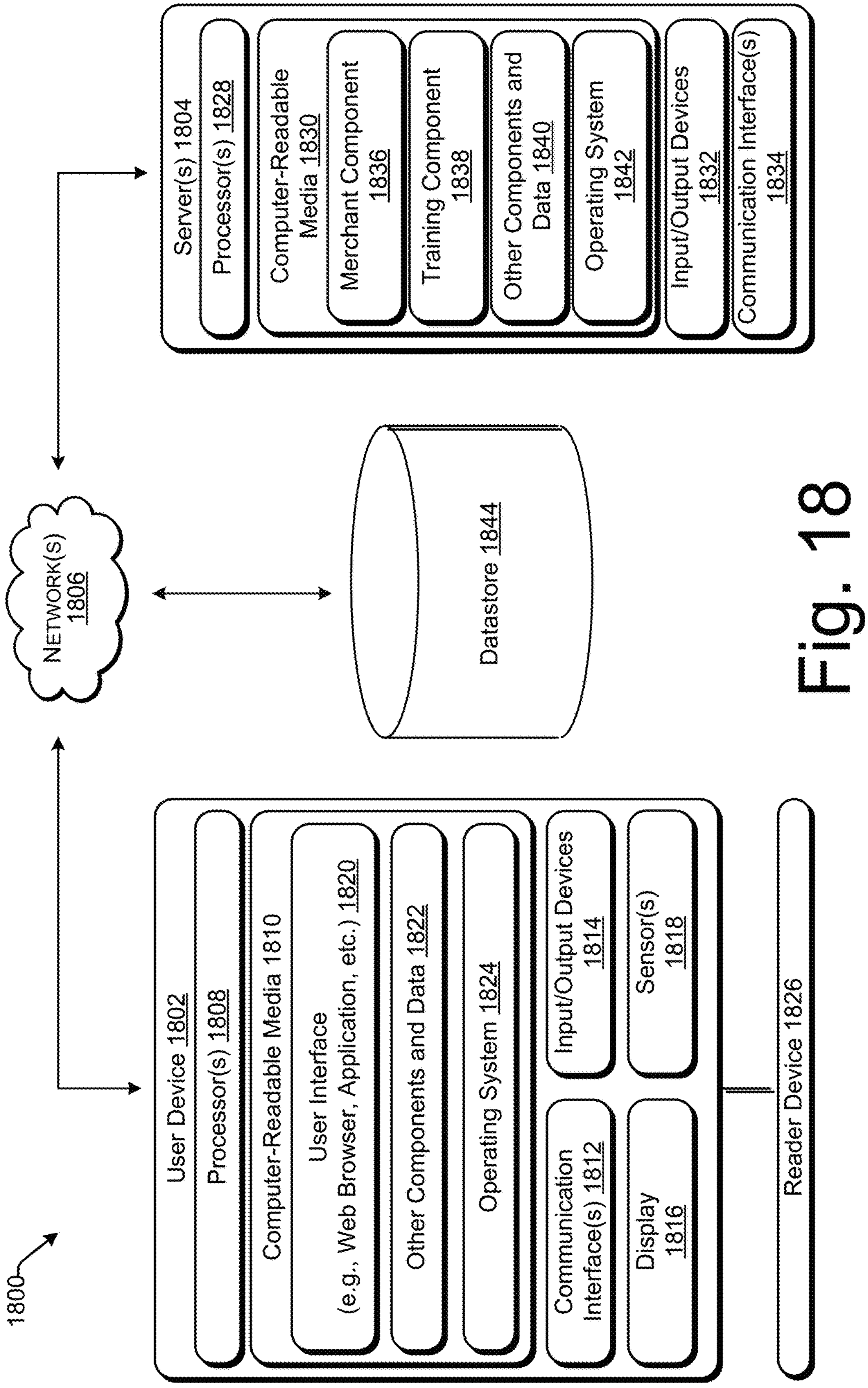
FIG. 18 is a block diagram showing a system for performing techniques described herein with which techniques described herein can be implemented, according to an implementation described herein.

FIG. 18 depicts an illustrative block diagram illustrating a system 1800 for performing techniques described herein. The system 1800 includes a user device 1802, that communicates with server computing device(s) (e.g., server(s) 1804) via network(s) 1806 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1802 is illustrated, in additional or alternate examples, the system 1800 can have multiple user devices. The user device 1802 is configurable as the first edge device 106 and/or the first and second edge devices 108.

In at least one example, the user device 1802 can be any suitable type of computing device, e.g., portable, semi-portable, semi-stationary, or stationary. Some examples of the user device 1802 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1802 can be any computing device capable of sending communications and performing the functions according to the techniques described herein. The user device 1802 can include devices, e.g., payment card readers, or components capable of accepting payments, as described below.

In the illustrated example, the user device 1802 includes one or more processors 1808, one or more computer-readable media 1810, one or more communication interface(s) 1812, one or more input/output (I/O) devices 1814, a display 1816, and sensor(s) 1818.

In at least one example, each processor 1808 can itself comprise one or more processors or processing cores. For example, the processor(s) 1808 can be implemented as one or more microprocessors, microcomputers, microcontrollers, digital signal processors, central processing units, state machines, logic circuitries, and/or any devices that manipulate signals based on operational instructions. In some examples, the processor(s) 1808 can be one or more hardware processors and/or logic circuits of any suitable type specifically programmed or configured to execute the algorithms and processes described herein. The processor(s) 1808 can be configured to fetch and execute computer-readable processor-executable instructions stored in the computer-readable media 1810.

Depending on the configuration of the user device 1802, the computer-readable media 1810 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1810 can include, but is not limited to, RAM, ROM, EEPROM, flash memory, solid-state storage, magnetic disk storage, optical storage, and/or other computer-readable media technology. Further, in some examples, the user device 1802 can access external storage, such as RAID storage systems, storage arrays, network attached storage, storage area networks, cloud storage, or any other medium that can be used to store information and that can be accessed by the processor(s) 1808 directly or through another computing device or network. Accordingly, the computer-readable media 1810 can be computer storage media able to store instructions, components or components that can be executed by the processor(s) 1808. Further, when mentioned, non-transitory computer-readable media exclude media such as energy, carrier signals, electromagnetic waves, and signals per se.

The computer-readable media 1810 can be used to store and maintain any number of functional components that are executable by the processor(s) 1808. In some implementations, these functional components comprise instructions or programs that are executable by the processor(s) 1808 and that, when executed, implement operational logic for performing the actions and services attributed above to the user device 1802. Functional components stored in the computer-readable media 1810 can include a user interface 1820 to enable users to interact with the user device 1802, and thus the server(s) 1804 and/or other networked devices. In at least one example, the user interface 1820 can be presented via a web browser, or the like. In other examples, the user interface 1820 can be presented via an application, such as a mobile application or desktop application, which can be provided by a service provider associated with the server(s) 1804, or which can be an otherwise dedicated application. In some examples, the user interface 1820 can be user interface 502 of FIG. 5, the first user interface 802 and second user interface 804 of FIG. 8, and so on. In at least one example, a user can interact with the user interface via touch input, spoken input, gesture, or any other type of input. The word "input" is also used to describe "contextual" input that may not be directly provided by the user via the user interface 1820. For example, user's interactions with the user interface 1820 are analyzed using, e.g., natural language processing techniques, to determine context or intent of the user, which may be treated in a manner similar to "direct" user input.

Depending on the type of the user device 1802, the computer-readable media 1810 can also optionally include other functional components and data, such as other components and data 1822, which can include programs, drivers, etc., and the data used or generated by the functional components. In addition, the computer-readable media 1810 can also store data, data structures and the like, that are used by the functional components. Further, the user device 1802 can include many other logical, programmatic and physical components, of which those described are merely examples that are related to the discussion herein.

In at least one example, the computer-readable media 1810 can include additional functional components, such as an operating system 1824 for controlling and managing various functions of the user device 1802 and for enabling basic user interactions.

The communication interface(s) 1812 can include one or more interfaces and hardware components for enabling communication with various other devices, such as over the network(s) 1806 or directly. For example, communication interface(s) 1812 can enable communication through one or more network(s) 1806, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1806 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1802 can further include one or more input/output (I/O) devices 1814. The I/O devices 1814 can include speakers, a microphone, a camera, and various user controls (e.g., buttons, a joystick, a keyboard, a keypad, etc.), a haptic output device, and so forth. The I/O devices 1814 can also include attachments that leverage the accessories (audio-jack, USB-C, Bluetooth, etc.) to connect with the user device 1802.

In at least one example, user device 1802 can include a display 1816. Depending on the type of computing device(s) used as the user device 1802, the display 1816 can employ any suitable display technology. For example, the display 1816 can be a liquid crystal display, a plasma display, a light emitting diode display, an OLED (organic light-emitting diode) display, an electronic paper display, or any other suitable type of display able to present digital content thereon. In at least one example, the display 1816 can be an augmented reality display, a virtual reality display, or any other display able to present and/or project digital content. In some examples, the display 1816 can have a touch sensor associated with the display 1816 to provide a touchscreen display configured to receive touch inputs for enabling interaction with a graphic interface presented on the display 1816. Accordingly, implementations herein are not limited to any particular display technology. Alternatively, in some examples, the user device 1802 may not include the display 1816, and information can be presented by other means, such as aurally, haptically, etc.

In addition, the user device 1802 can include sensor(s) 1818. The sensor(s) 1818 can include a GPS device able to indicate location information. Further, the sensor(s) 1818 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 1802 can include various other components that are not shown, examples of which include removable storage, a power source, such as a battery and power control unit, a barcode scanner, a printer, a cash drawer, and so forth.

In addition, in some examples, the user device 1802 can include, be connectable to, or otherwise be coupled to a reader device 1826, for reading payment instruments and/or identifiers associated with payment objects. In some examples, as described above, the reader device 1826 can plug in to a port in the user device 1802, such as a microphone port, a headphone port, an audio-jack, a data port, or other suitable port. In additional or alternative examples, the reader device 1826 can be coupled to the user device 1802 via another wired or wireless connection, such as via a Bluetooth®, BLE, and so on. The reader device 1826 can include a read head for reading a magnetic strip of a payment card, and further can include encryption technology for encrypting the information read from the magnetic strip. Additionally or alternatively, the reader device 1826 can be an EMV payment reader, which in some examples, can be embedded in the user device 1802. Moreover, numerous other types of readers can be employed with the user device 1802 herein, depending on the type and configuration of the user device 1802.

The reader device 1826 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1826 may include hardware implementation, such as slots, magnetic tracks, and rails with one or more sensors or electrical contacts to facilitate detection and acceptance of a payment instrument. That is, the reader device 1826 may include hardware implementations to enable the reader device 1826 to interact with a payment instrument via a swipe (i.e., a card-present transaction where a customer slides a card having a magnetic strip through a payment reader that captures payment data contained in the magnetic strip), a dip. (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1826 may also include a biometric sensor to receive and process biometric characteristics and process them as payment instruments, given that such biometric characteristics are registered with the payment service and connected to a financial account with a bank server.

The reader device 1826 may include processing unit(s), computer-readable media, a reader chip, a transaction chip, a timer, a clock, a network interface, a power supply, and so on. The processing unit(s) of the reader device 1826 may execute one or more components and/or processes to cause the reader device 1826 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1826, the computer-readable media may include volatile memory (such as RAM), non-volatile memory (such as ROM, flash memory, miniature hard drive, memory card, or the like), or some combination thereof. In at least one example, the computer-readable media of the reader device 1826 may include at least one component for performing various functions as described herein.

The reader chip may perform functionalities to control the operations and processing of the reader device 1826. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1806, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1826. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1802, which can be a POS terminal, and the reader device 1826 are shown as separate devices, in additional or alternative examples, the user device 1802 and the reader device 1826 can be part of a single device, which may be a battery-operated device. In such an example, components of both the user device 1802 and the reader device 1826 may be associated with the single device. In some examples, the reader device 1826 can have a display integrated therewith, which can be in addition to (or as an alternative of) the display 1816 associated with the user device 1802.

The server(s) 1804 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1804 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1804 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1804 can include one or more processors 1828, one or more computer-readable media 1830, one or more I/O devices 1832, and one or more communication interfaces 1834. Each processor 1828 can be a single processing unit or a number of processing units, and can include single or multiple computing units or multiple processing cores. The processor(s) 1828 can be implemented as one or more microprocessors, microcomputers, microcontrollers, digital signal processors, central processing units, state machines, logic circuitries, and/or any devices that manipulate signals based on operational instructions. For example, the processor(s) 1828 can be one or more hardware processors and/or logic circuits of any suitable type specifically programmed or configured to execute the algorithms and processes described herein. The processor(s) 1828 can be configured to fetch and execute computer-readable instructions stored in the computer-readable media 1830, which can program the processor(s) 1828 to perform the functions described herein.

The computer-readable media 1830 can include volatile and nonvolatile memory and/or removable and non-removable media implemented in any type of technology for storage of information, such as computer-readable instructions, data structures, program components, or other data. Such computer-readable media 1830 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1804, the computer-readable media 1830 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1830 can be used to store any number of functional components that are executable by the processor(s) 1828. In many implementations, these functional components comprise instructions or programs that are executable by the processors 1828 and that, when executed, specifically configure the one or more processors 1828 to perform the actions attributed above to the service provider and/or payment processing service. Functional components stored in the computer-readable media 1830 can optionally include a merchant component 1836, a training component 1838, and one or more other components and data 1840.

The merchant component 1836 can be configured to receive transaction data from POS systems. The merchant component 1836 can transmit requests (e.g., authorization, capture, settlement, etc.) to payment service server computing device(s) to facilitate POS transactions between merchants and customers. The merchant component 1836 can communicate the successes or failures of the POS transactions to the POS systems.

The training component 1838 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1802 and/or the server(s) 1804 for use at a time after the data models have been trained (e.g., at runtime).

The one or more other components and data 1840 can include the first and second unified wallets 134, first and second unified wallets 140, the wallet application 402, control module 418, and so forth, the functionality of which is described, at least partially, above. Further, the one or more other components and data 1840 can include programs, drivers, etc., and the data used or generated by the functional components. Further, the server(s) 1804 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that the modules generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize an SDK to integrate third-party service provider functionality into its applications. That is, API(s) and/or SDK(s) can enable third-party developers to customize how their respective third-party applications interact with the service provider or vice versa.

The computer-readable media 1830 can additionally include an operating system 1842 for controlling and managing various functions of the server(s) 1804.

The communication interface(s) 1834 can include one or more interfaces and hardware components for enabling communication with various other devices, such as over the network(s) 1806 or directly. For example, communication interface(s) 1834 can enable communication through one or more network(s) 1806, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1806 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1804 can further be equipped with various I/O devices 1832. Such I/O devices 1832 can include a display, various user interface controls (e.g., buttons, joystick, keyboard, mouse, touch screen, biometric or sensory input devices, etc.), audio speakers, connection ports and so forth.

In at least one example, the system 1800 can include a datastore 1844 that can be configured to store data that is accessible, manageable, and updatable. In some examples, the datastore 1844 can be integrated with the user device 1802 and/or the server(s) 1804. In other examples, as shown in FIG. 18, the datastore 1844 can be located remotely from the server(s) 1804 and can be accessible to the server(s) 1804. The datastore 1844 can comprise multiple databases and/or servers connected locally and/or remotely via the network(s) 1806.

In at least one example, the datastore 1844 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1844 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1844 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

displaying, at a first edge device associated with one or more decentralized networks, an interactive user interface with a first interactive element that includes a unified balance having a single value representative of a total value of cryptographic tokens available via:

a first set of cryptographic tokens available via a layer 2 network of the one or more decentralized networks, wherein the layer 2 network is layered on top of a layer 1 network of the one or more decentralized networks, and wherein the layer 2 network is associated with a first cryptographic key generated by the first edge device; and a second set of cryptographic tokens available via the layer 1 network, wherein the layer 1 network is associated with a second cryptographic key that is generated by a hardware key device, wherein the hardware key device is associated with the first edge device and includes data for verifying an identity of a user associated with the first edge device using one or more biometric sensors associated with the hardware key device;

receiving a request to initiate a transfer of a portion of the total value of cryptographic tokens to a second edge device associated with the one or more decentralized networks, wherein the request is represented by a second interactive element of the interactive user interface;

comparing the portion of the total value of cryptographic tokens to the first set of cryptographic tokens and the second set of cryptographic tokens;

automatically detecting, based on the comparison, a lack of sufficient liquidity by the layer 1 network or the layer 2 network;

automatically transferring, responsive to the automatically detected lack of sufficient liquidity and without user intervention, cryptographic tokens in support of sufficient liquidity between the layer 1 network and the layer 2 network;

receiving, at the first edge device, an indication of an interaction with the second interactive element to initiate the transfer of the portion;

verifying, with at least one of the first cryptographic key and the second cryptographic key, the request with the hardware key device associated with the one or more decentralized networks; and executing, in response to the interaction, the transfer of the portion to the second edge device over the one or more decentralized networks.

2. The method as described in claim 1, wherein automatically transferring the cryptographic tokens utilizes opportunistic on-chain liquidity management by leveraging an on-chain event involving the layer 1 network.

3. The method as described in claim 2, wherein the opportunistic on-chain liquidity management employs opportunistic splicing in which the transfer is grouped with another transfer.

4. The method as described in claim 1, wherein automatically transferring the cryptographic tokens is performed based on machine learning by a machine-learning model.

5. The method as described in claim 1, further comprising:

determining whether to perform the transfer via the layer 1 network or the layer 2 network.

6. The method as described in claim 5, wherein determining whether to perform the transfer is based on at least one of:

an amount of time to perform the transfer, respectively, by the layer 1 network or the layer 2 network; and an amount of fees to perform the transfer, respectively, by the layer 1 network or the layer 2 network.

7. The method as described in claim 1, further comprising:

determining to initiate the transfer of the portion based on whether the portion exceeds a threshold.

8. The method as described in claim 7, wherein determining to initiate the transfer of the portion includes restricting the transfer responsive to the determining the portion exceeds the threshold.

9. The method as described in claim 7, wherein determining to initiate the transfer of the portion further comprises:

requesting an attestation from the hardware key device responsive to determining the portion exceeds the threshold.

10. A device comprising:

a processing device; and a computer-readable storage medium storing instruction that, responsive to execution by the processing device, causes the processing device to perform operations including:

displaying, at a first edge device associated with one or more decentralized networks, an interactive user interface with a first interactive element that includes a unified balance having a single value representative of a total value of cryptographic tokens available via:

a first set of cryptographic tokens available via a layer 2 network of the one or more decentralized networks, wherein the layer 2 network layered on top of a layer 1 network of the one or more decentralized networks, and wherein the layer 2 network is associated with a first cryptographic key generated by the first edge device; and a second set of cryptographic tokens available via the layer 1 network, wherein the layer 1 network is associated with a second cryptographic key that is generated by a hardware key device, wherein the hardware key device is associated with the first edge device and includes data for verifying an identity of a user associated with the first edge device using one or more biometric sensors associated with the hardware key device;

receiving a request to initiate a transfer of a portion of the total value of cryptographic tokens to a second edge device associated with the one or more decentralized networks, wherein the request is represented by a second interactive element of the interactive user interface;

comparing the portion of the total value of cryptographic tokens to the first set of cryptographic tokens and the second set of cryptographic tokens;

automatically detecting, based on the comparison, a lack of sufficient liquidity by the layer 1 network or the layer 2 network;

automatically transferring, responsive to the automatically detected lack of sufficient liquidity and without user intervention, cryptographic tokens in support of sufficient liquidity between the layer 1 network and the layer 2 network;

receiving, at the first edge device, an indication of an interaction with the second interactive element to initiate the transfer of the portion;

verifying, with at least one of the first cryptographic key and the second cryptographic key, the request with the hardware key device associated with the one or more decentralized networks; and executing, in response to the interaction, the transfer of the portion to the second edge device over the one or more decentralized networks.

11. The device as described in claim 10, wherein automatically transferring the cryptographic tokens utilizes opportunistic on-chain liquidity management by leveraging an on-chain event involving the layer 1 network.

12. The device as described in claim 11, wherein the opportunistic on-chain liquidity management employs opportunistic splicing in which the transfer is grouped with another transfer.

13. The device as described in claim 10, wherein automatically transferring the cryptographic tokens is performed based on machine learning by a machine-learning model.

14. The device as described in claim 10, further comprising determining whether to perform the transfer via the layer 1 network or the layer 2 network.

15. The device as described in claim 14, wherein the determining whether to perform the transfer is based on at least one of:

an amount of time to perform the transfer, respectively, by the layer 1 network or the layer 2 network; and an amount of fees to perform the transfer, respectively, by the layer 1 network or the layer 2 network.

16. The device as described in claim 10, further comprising;

determining to initiate the transfer of the portion based on whether the portion exceeds a threshold.

17. One or more computer-readable storage media that are non-transitory that, responsive to execution by a processing device, causes the processing device to perform operations including:

displaying, at a first edge device associated with one or more decentralized networks, an interactive user interface with a first interactive element that includes a unified balance having a single value representative of a total value of cryptographic tokens available via:

a first set of cryptographic tokens available via a layer 2 network of the one or more decentralized networks, wherein the layer 2 network layered on top of a layer 1 network of the one or more decentralized networks, and wherein the layer 2 network is associated with a first cryptographic key generated by the first edge device; and a second set of cryptographic tokens available via the layer 1 network, wherein the layer 1 network is associated with a second cryptographic key that is generated by a hardware key device, wherein the hardware key device is associated with the first edge device and includes data for verifying an identity of a user associated with the first edge device using one or more biometric sensors associated with the hardware key device;

receiving a request to initiate a transfer of a portion of the total value of cryptographic tokens to a second edge device associated with the one or more decentralized networks, wherein the request is represented by a second interactive element of the interactive user interface;

comparing the portion of the total value of cryptographic tokens to the first set of cryptographic tokens and the second set of cryptographic tokens;

automatically detecting, based on the comparison, a lack of sufficient liquidity by the layer 1 network or the layer 2 network;

automatically transferring, responsive to the automatically detected lack of sufficient liquidity and without user intervention, cryptographic tokens in support of sufficient liquidity between the layer 1 network and the layer 2 network;

receiving, at the first edge device, an indication of an interaction with the second interactive element to initiate the transfer of the portion;

verifying, with at least one of the first cryptographic key and the second cryptographic key, the request with the hardware key device associated with the one or more decentralized networks; and executing, in response to the interaction, the transfer of the portion to the second edge device over the one or more decentralized networks.

18. The one or more computer-readable storage media as described in claim 17, wherein automatically transferring the cryptographic tokens utilizes opportunistic on-chain liquidity management by leveraging an on-chain event involving the layer 1 network.

* * * * *